US011166266B2

(12) United States Patent
Li et al.

(10) Patent No.: US 11,166,266 B2
(45) Date of Patent: Nov. 2, 2021

(54) INFORMATION SENDING METHOD AND APPARATUS AND INFORMATION RECEIVING METHOD AND APPARATUS

(71) Applicant: HUAWEI TECHNOLOGIES CO., LTD., Guangdong (CN)

(72) Inventors: Chaojun Li, Beijing (CN); Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/430,831

(22) Filed: Jun. 4, 2019

(65) Prior Publication Data

US 2019/0289579 A1    Sep. 19, 2019

Related U.S. Application Data

(63) Continuation of application No. PCT/CN2017/083269, filed on May 5, 2017.

(30) Foreign Application Priority Data

Feb. 4, 2017    (WO) ................ PCT/CN2017/072899

(51) Int. Cl.
*H04W 72/04*    (2009.01)
*H04L 5/00*    (2006.01)
*H04W 72/12*    (2009.01)

(52) U.S. Cl.
CPC ......... *H04W 72/042* (2013.01); *H04L 5/0053* (2013.01); *H04W 72/04* (2013.01);
(Continued)

(58) Field of Classification Search
None
See application file for complete search history.

(56) References Cited

U.S. PATENT DOCUMENTS 10,123,316 B2 * 11/2018 Freda ............... H04L 5/0092
2010/0215004 A1 * 8/2010 Yoo ................... H04L 1/0031
370/329

(Continued)

FOREIGN PATENT DOCUMENTS

CN    101932024 A    12/2010
CN    102149208 A    8/2011
(Continued)

OTHER PUBLICATIONS

Office Action issued in Chinese Application No. 201910120547.8 dated Aug. 29, 2019, 6 pages.
(Continued)

*Primary Examiner* — Noel R Beharry
*Assistant Examiner* — Rodrick Mak
(74) *Attorney, Agent, or Firm* — Fish & Richardson P.C.

(57) ABSTRACT

Information sending and receiving methods are provided. The information sending method includes: determining, by a network device, configuration information of N downlink control channel regions, where the N downlink control channel regions include a first downlink control channel region, the configuration information of the N downlink control channel regions includes configuration information of the first downlink control channel region, and N is a positive integer; and sending, by the network device, the configuration information of the N downlink control channel regions to a terminal device, so that the terminal device determines the N downlink control channel regions based on the configuration information of the N downlink control channel regions.

16 Claims, 7 Drawing Sheets

(52) U.S. Cl.
CPC ... *H04W 72/0446* (2013.01); *H04W 72/0453* (2013.01); *H04W 72/1289* (2013.01)

(56) References Cited

U.S. PATENT DOCUMENTS

| | | | | |
|---|---|---|---|---|
| 2011/0075624 | A1* | 3/2011 | Papasakellariou | H04L 5/0053 370/329 |
| 2011/0103336 | A1* | 5/2011 | Ishii | H04L 5/001 370/329 |
| 2012/0039275 | A1* | 2/2012 | Chen | H04L 5/001 370/329 |
| 2012/0057521 | A1* | 3/2012 | Liang | H04L 1/1887 370/315 |
| 2012/0063349 | A1* | 3/2012 | Kim | H04L 5/0007 370/252 |
| 2012/0320854 | A1* | 12/2012 | Sumasu | H04J 11/0056 370/329 |
| 2013/0039188 | A1* | 2/2013 | Larsson | H04L 1/0039 370/241 |
| 2013/0039291 | A1 | 2/2013 | Blankenship et al. | |
| 2013/0188592 | A1* | 7/2013 | Yang | H04L 5/00 370/329 |
| 2013/0194956 | A1* | 8/2013 | Sartori | H04W 74/0833 370/252 |
| 2014/0036803 | A1* | 2/2014 | Park | H04W 72/042 370/329 |
| 2014/0112312 | A1* | 4/2014 | Kim | H04L 5/0023 370/335 |
| 2014/0321422 | A1* | 10/2014 | Choi | H04L 5/0055 370/330 |
| 2015/0245322 | A1* | 8/2015 | Shimezawa | H04L 5/0053 370/329 |
| 2015/0282128 | A1 | 10/2015 | Cui | |
| 2019/0045492 | A1* | 2/2019 | Urabayashi | H04L 5/0053 |

FOREIGN PATENT DOCUMENTS

| | | | | |
|---|---|---|---|---|
| CN | 103178942 | A | 6/2013 | |
| CN | 104396326 | A | 3/2015 | |
| CN | 104737478 | A | 6/2015 | |
| CN | 104812079 | A | 7/2015 | |
| CN | 106162656 | A | 11/2016 | |
| WO | WO-2008157692 | A2 * | 12/2008 | H04L 5/0094 |
| WO | 2014048184 | A1 | 4/2014 | |
| WO | 2017041301 | A1 | 3/2017 | |

OTHER PUBLICATIONS

Extended European Search Report issued in European Application No. 17894962.4 dated Mar. 13, 2020, 11 pages.
Intel Corporation, "Physical Downlink Control Channel Design for NR," 3GPP TSG RAN WG1 Ad-Hoc Meeting, R1-1700359; Spokane, USA, XP051207896, Jan. 16-20, 2017, 5 pages.
Nokia et al, "Configuring and signaling ePDCCH resources," 3GPP TSG-RAN WG1 Meeting #70, R1-123657; Qingdao, P.R. China, XP050661532, Aug. 13-17, 2012, 3 pages.
NTT Docomo, "Design of EPDCCH search space for low cost MTC," 3GPP TSG RAN WG1 Meeting #79, R1-144964; San Francisco, USA, XP050876012, Nov. 17-21, 2014, 4 pages.
NTT Docomo, Inc., "Monitoring of DL control channel for NR," 3GPP TSG RAN WG1 Meeting #87, R1-1612716, Reno, USA, Nov. 14-18, 2016, 5 pages.
Ericsson, "On downlink control signaling structure," TSG-RAN WG1 #87, R1-1612913, Reno, NV, USA, Nov. 14-18, 2016, 2 pages.
Huawei, HiSilicon, "Downlink control channel structures," 3GPP TSG RAN WG1 Meeting #87, R1-1611207, Reno, USA, Nov. 14-18, 2016, 6 pages.
Office Action issued in Japanese Application No. 2019-542371 dated Aug. 24, 2020, 7 pages (with English translation).
3GPP TS 36.214 V14.1.0 (Dec. 2016); 3rd Generation Partnership Project; Technical Specification Group Radio Access Network;Evolved Universal Terrestrial Radio Access (E-UTRA); Physical layer; Measurements (Release 14), Dec. 2016, 20 pages.
3GPP TS 36.212 V14.1.1 (Jan. 2017); 3rd Generation Partnership Project; Technical Specification Group Radio Access Network; Evolved Universal Terrestrial Radio Access (E-UTRA); Multiplexing and channel coding (Release 14), Jan. 2017, 149 pages.
3GPP TS 36.331 V14.1.0 (Dec. 2016); 3rd Generation Partnership Project;Technical Specification Group Radio Access Network; Evolved Universal Terrestrial Radio Access (E-UTRA);Radio Resource Control (RRC); Protocol specification (Release 14), Dec. 2016, 654 pages.
3GPP TS 36.211 V14.1.0 (Dec. 2016); 3rd Generation Partnership Project; Technical Specification Group Radio Access Network; Evolved Universal Terrestrial Radio Access (E-UTRA); Physical channels and modulation (Release 14), Dec. 2012, 175 pages.
3GPP TS 36.213 V14.1.0 (Dec. 2016); 3rd Generation Partnership Project; Technical Specification Group Radio Access Network; Evolved Universal Terrestrial Radio Access (E-UTRA); Physical layer procedures (Release 14), Dec. 2016,414 pages.
PCT International Search Report and Written Opinion issued in International Application No. PCT/CN2017/072899 dated Sep. 11, 2017, 6 pages (partial English translation).
R1-1701732, Huawei et al., "sPDCCH multiplexing with data", 3GPP TSG RAN WG1 Meeting #88, Athens, Greece, Feb. 13-17, 2017, 5 pages.
R1-1704265, Huawei et al., "sPDCCH multiplexing with data",3GPP TSG RAN WG1 Meeting #88b, Spokane, USA, Apr. 3-7, 2017, 6 pages.
Office Action issued in Indian Application No. 201937032589 dated Jan. 15, 2021, 6 pages.

* cited by examiner

INFORMATION SENDING METHOD AND APPARATUS AND INFORMATION RECEIVING METHOD AND APPARATUS

CROSS REFERENCE TO RELATED APPLICATIONS

This application is a continuation of International Application No. PCT/CN2017/083269, filed on May 5, 2017, which claims priority to International Patent Application No. PCT/CN2017/072899, filed on Feb. 4, 2017. The disclosures of the aforementioned applications are hereby incorporated by reference in their entireties.

TECHNICAL FIELD

Embodiments of the present invention relate to the communications field, and in particular, to an information sending method and apparatus and an information receiving method and apparatus.

BACKGROUND

In an Long Term Evolution (LTE) system, before receiving downlink data, a terminal device needs to know downlink scheduling information configured by a network device for the terminal device, for example, a time-frequency resource allocation or a modulation and coding scheme. Likewise, before sending uplink data, the terminal device also needs to know uplink scheduling information. In addition, the network device needs to notify the terminal device of power control command information related to uplink transmission. The uplink scheduling information, the downlink scheduling information, and the power control command information may be all referred to as downlink control information (DCI). The DCI is used to schedule data transmission. The network device mainly carry the DCI on a physical downlink control channel (PDCCH). A search space is a set of PDCCHs to be detected by the terminal device. Therefore, the terminal device needs to determine the search space in a PDCCH region, to obtain the DCI on one or more PDCCHs in the search space.

PDCCHs defined in current communications system are all used to schedule data transmission whose transmission time interval (TTI) length is 1 millisecond (ms). For data transmission whose TTI length is less than 1 ms, a disadvantage of a relatively high scheduling latency exists. To meet different service requirements or scenario requirements, a system needs to include data transmission with a plurality of TTI lengths, for example, a short TTI (short TTI) having a TTI length less than 1 ms, to introduce an sPDCCH (for example, a PDCCH for a short TTI, or a shortened PDCCH) in each short TTI. If a PDCCH mapping manner defined in existing LTE Rel-8 (release-8) is used, an sPDCCH region and a data region are located on different symbols. However, each short TTI includes only a small quantity of sPDCCHs. Consequently, a waste of resources is caused. If an EPDCCH mapping manner defined in Rel-11 is used, an sPDCCH occupies all symbols in a short TTI. Consequently, a terminal device needs a relatively long time to detect the sPDCCH, thereby affecting latency reduction. Therefore, for data transmission having a plurality of TTI lengths, a downlink control channel region needs to be more flexibly configured.

SUMMARY

Embodiments of the present invention provide an information sending method and apparatus and an information receiving method and apparatus, to flexibly configure a downlink control channel region.

According to a first aspect, an information receiving method is provided, including: receiving, by a terminal device, configuration information of N downlink control channel regions, where the N downlink control channel regions include a first downlink control channel region, the configuration information of the N downlink control channel regions includes configuration information of the first downlink control channel region, and N is a positive integer; and determining, by the terminal device, the N downlink control channel regions based on the configuration information of the N downlink control channel regions, where the configuration information of the first downlink control channel region includes at least one of first indication information, second indication information, third indication information, fourth indication information, and fifth indication information, wherein the first indication information indicates whether downlink scheduling information comprises resource indication information of the first downlink control channel region;

the second indication information indicates a quantity of search spaces in the first downlink control channel region, wherein the quantity of search spaces in the first downlink control channel region is 0 or a positive integer;

the third indication information indicates a quantity of symbols occupied by the first downlink control channel region in time domain, wherein the quantity of symbols occupied by the first downlink control channel region in time domain is a positive integer less than or equal to 7;

the fourth indication information indicates a time length of data transmission corresponding to the first downlink control channel region; and the fifth indication information indicates a mapping manner for a downlink control channel in the first downlink control channel region, wherein the mapping manner for the downlink control channel in the first downlink control channel region includes a centralized mapping manner or a distributed mapping manner.

Optionally, the resource indication information of the first downlink control channel region indicates a resource that is in the first downlink control channel region and that is available for downlink data transmission; or the resource indication information of the first downlink control channel region indicates a resource that is in the first downlink control channel region and that is not available for downlink data transmission; or the resource indication information of the first downlink control channel region indicates a resource that is in the first downlink control channel region and that is occupied by a downlink control channel; or the resource indication information of the first downlink control channel region indicates a resource that is in the first downlink control channel region and that is not occupied by a downlink control channel.

Optionally, the first indication information is carried in higher layer signaling, or carried on a PDCCH defined in LTE Rel-8.

Optionally, the configuration information of the first downlink control channel region further includes sixth indication information, wherein the sixth indication information indicates a quantity of bits of the resource indication information of the first downlink control channel region, where the resource indication information of the first downlink control channel region is included in the downlink scheduling information.

Optionally, after the determining, by the terminal device, the N downlink control channel regions based on the configuration information of the N downlink control channel regions, the method further includes:

receiving, by the terminal device, the downlink scheduling information, where the downlink scheduling information is carried on one or more downlink control channels in the N downlink control channel regions; and determining, by the terminal device based on the downlink scheduling information, a resource occupied by downlink data.

Optionally, the resource occupied by the downlink data does not include a resource that is outside the N downlink control channel regions and that is configured for occupation by a downlink control channel of another terminal device, and the another terminal device and the terminal device are different terminal devices.

Optionally, the downlink scheduling information includes frequency domain resource information for the downlink data, the configuration information of the first downlink control channel region includes the first indication information, and the determining, by the terminal device based on the downlink scheduling information, a resource occupied by downlink data includes:

determining, by the terminal device based on the frequency domain resource information for the downlink data and the resource indication information of the first downlink control channel region, the resource occupied by the downlink data, where the first indication information indicates that the downlink scheduling information includes the resource indication information of the first downlink control channel region, and/or the quantity of bits of the resource indication information of the first downlink control channel region that is comprised in the downlink scheduling information and that is indicated by the sixth indication information is a positive integer; or determining, by the terminal device, that the resource occupied by the downlink data does not include a resource corresponding to the first downlink control channel region, where the first indication information indicates that the downlink scheduling information does not include the resource indication information of the first downlink control channel region, and/or the quantity of bits of the resource indication information of the first downlink control channel region that is comprised in the downlink scheduling information and that is indicated by the sixth indication information is 0.

Optionally, the configuration information of the first downlink control channel region includes the fifth indication information; and the fifth indication information indicates that the mapping manner for the downlink control channel in the first downlink control channel region is the centralized mapping manner, and the terminal device determines that the quantity of symbols occupied by the first downlink control channel region in time domain is 1, 2, or 3; or the fifth indication information indicates that the mapping manner for the downlink control channel in the first downlink control channel region is the distributed mapping manner, and the terminal device determines that the quantity of symbols occupied by the first downlink control channel region in time domain is 1.

Optionally, if the fifth indication information indicates that the mapping manner for the downlink control channel in the first downlink control channel region is the centralized mapping manner, the quantity of symbols occupied by the first downlink control channel region in time domain is S1-L. If the fifth indication information indicates that the mapping manner for the downlink control channel in the first downlink control channel region is the distributed mapping manner, the quantity of symbols occupied by the first downlink control channel region in time domain is S1-D. A value of S1-L is greater than or equal to that of S1-D. Therefore, when the centralized mapping manner is used, a time domain resource may occupy a plurality of symbols (for example, two or three symbols), so that frequency domain resources can be as centralized as possible, and configured on a PRB with an optimal channel condition. When the distributed mapping manner is used, a quantity of symbols occupied by a time domain resource should be as small as possible, so that a frequency domain resource can be as broadened as possible, to obtain a better frequency diversity effect.

Optionally, the configuration information of the first downlink control channel region further includes seventh indication information, and the seventh indication information indicates a scheduling information type of downlink control information DCI transmitted in a search space in the first downlink control channel region; or the configuration information of the first downlink control channel region further includes eighth indication information, and the eighth indication information indicates a scheduling information type of downlink control information transmitted in the first downlink control channel region, where the scheduling information type includes uplink scheduling information or downlink scheduling information.

Optionally, the configuration information of the first downlink control channel region includes ninth indication information, and the ninth indication information indicates a frequency domain resource occupied by the first downlink control channel region. Optionally, the ninth indication information indicates that the first downlink control channel region occupies contiguous frequency domain resources, and a value range of the quantity of symbols occupied by the first downlink control channel region in time domain is at least two of 1, 2, and 3. Optionally, the ninth indication information indicates that the first downlink control channel region occupies noncontiguous frequency domain resources, wherein the quantity of symbols occupied by the first downlink control channel region in time domain is 1, or a value range of the quantity of symbols occupied by the first downlink control channel region in time domain is 1 and 2.

Optionally, the N downlink control channel regions include a second downlink control channel region, the configuration information of the N downlink control channel regions includes configuration information of the second downlink control channel region, and the configuration information of the second downlink control channel region includes at least one of eleventh indication information, twelfth indication information, thirteenth indication information, fourteenth indication information, and fifteenth indication information;

the eleventh indication information indicates whether downlink scheduling information comprises resource indication information of the second downlink control channel region;

the twelfth indication information indicates a quantity of search spaces in the second downlink control channel region, wherein the quantity of search spaces in the second downlink control channel region is 0 or a positive integer;

the thirteenth indication information indicates a quantity of symbols occupied by the second downlink control channel region in time domain, the quantity of symbols occupied by the second downlink control channel region in time domain is a positive integer less than or equal to 7, wherein the quantity of symbols occupied by the second downlink control channel region in time domain is different from the quantity of symbols occupied by the first downlink control channel region in time domain;

the fourteenth indication information indicates a time length of data transmission corresponding to the second downlink control channel region, and the time length of data transmission corresponding to the second downlink control channel region is different from the time length of data transmission corresponding to the first downlink control channel region; and the fifteenth indication information indicates a mapping manner for a downlink control channel in the second downlink control channel region, wherein the mapping manner for the downlink control channel in the second downlink control channel region is different from the mapping manner for the downlink control channel in the first downlink control channel region.

Optionally, the fourth indication information indicates that the time length of data transmission corresponding to the first downlink control channel region is two or three symbols, and the fourteenth indication information indicates that the time length of data transmission corresponding to the second downlink control channel region is one slot.

Optionally, the fourth indication information indicates that the time length of data transmission corresponding to the first downlink control channel region is two or three symbols, the second indication information indicates that the quantity of search spaces in the first downlink control channel region is greater than 0, the fourteenth indication information indicates that the time length of data transmission corresponding to the second downlink control channel region is one slot, and the twelfth indication information indicates that the quantity of search spaces in the second downlink control channel region is 0. In this way, the terminal device does not need to search the second downlink control channel region for a downlink control channel, but still needs to know a downlink control channel occupation status in the region, to release a resource for use by downlink data.

Optionally, the configuration information of the second downlink control channel region further includes eighteenth indication information, and the eighteenth indication information indicates a scheduling information type of downlink control information transmitted in the second downlink control channel region.

Optionally, the eighth indication information indicates that the first downlink control channel region includes only uplink scheduling information, and the eighteenth indication information indicates that the second downlink control channel region includes only downlink scheduling information.

Optionally, the eighth indication information indicates that the first downlink control channel region includes only uplink scheduling information, and the eighteenth indication information indicates that the second downlink control channel region includes downlink scheduling information and uplink scheduling information.

Optionally, the first downlink control channel region includes N CCEs, each of the N CCEs includes C SREGs, each SREG occupies six subcarriers in frequency domain and occupies one symbol in time domain, and C is 6, 8, or 10; or each SREG occupies six subcarriers in frequency domain and occupies two symbols in time domain, and C is 3, 4, or 5. Optionally, each CCE includes C noncontiguous SREGs, and a resource available for the downlink data transmission in the first downlink control channel region or a resource not available for the downlink data transmission in the first downlink control channel region is indicated based on a minimum granularity of two CCEs.

Optionally, the downlink scheduling information includes first downlink control channel region occupation information and the frequency domain resource information for the downlink data; or the configuration information of the first downlink control channel region includes twenty-first indication information, the twenty-first indication information indicates first downlink control channel region occupation information, and the twenty-first indication information is carried in higher layer signaling. The first downlink control channel region occupation information indicates whether the resource occupied by the downlink data includes a resource of the first downlink control channel region. Optionally, the first downlink control channel region occupation information is 1-bit information. When the 1-bit information is A, it indicates that the resource occupied by the downlink data includes the resource of the first downlink control channel region; or when the 1-bit information is B, it indicates that the resource occupied by the downlink data does not include the resource of the first downlink control channel region. A is binary '1', and B is binary '0'; or B is binary '1', and A is binary '0'.

Optionally, if the 1-bit information is A, the determining, by the terminal device based on the downlink scheduling information, a resource occupied by downlink data includes:

determining, by the terminal device based on the frequency domain resource information for the downlink data, an initial resource occupied by the downlink data; and determining, by the terminal device, that the resource occupied by the downlink data is a remaining resource obtained by subtracting the resource that is in the first downlink control channel region and that is not available for the downlink data transmission from the initial resource occupied by the downlink data.

The resource that is in the first downlink control channel region and that is not available for the downlink data transmission is a resource occupied by a downlink control channel detected by the terminal device in an overlapping region between the initial resource occupied by the downlink data and the first downlink control channel region, or the resource that is in the first downlink control channel region and that is not available for the downlink data transmission is a resource occupied by a downlink control channel detected by the terminal device in an overlapping region between the initial resource occupied by the downlink data and the first downlink control channel region, as well as a CCE/RB before a CCE/RB occupied by the detected downlink control channel.

Optionally, if the 1-bit information is B, the determining, by the terminal device based on the downlink scheduling information, a resource occupied by downlink data includes:

determining, by the terminal device based on the frequency domain resource information for the downlink data, an initial resource occupied by the downlink data; and determining, by the terminal device, that the resource occupied by the downlink data is a remaining resource obtained by subtracting the resource occupied by the first downlink control channel region from the initial resource occupied by the downlink data.

According to a second aspect, an information sending method is provided, including:

determining, by a network device, configuration information of N downlink control channel regions, where the N downlink control channel regions include a first downlink control channel region, the configuration information of the N downlink control channel regions includes configuration information of the first downlink control channel region, and N is a positive integer; and sending, by the network device, the configuration information of the N downlink control channel regions, where the configuration information of the first downlink control channel region includes at least one of first indication information, second indication information, third indication information, fourth indication information, and fifth indication information, wherein the first indication information indicates whether downlink scheduling information includes resource indication information of the first downlink control channel region;

the second indication information indicates a quantity of search spaces in the first downlink control channel region, wherein the quantity of search spaces in the first downlink control channel region is 0 or a positive integer;

the third indication information indicates a quantity of symbols occupied by the first downlink control channel region in time domain, wherein the quantity of symbols occupied by the first downlink control channel region in time domain is a positive integer less than or equal to 7;

the fourth indication information indicates a time length of data transmission corresponding to the first downlink control channel region; and the fifth indication information indicates a mapping manner for a downlink control channel in the first downlink control channel region, wherein the mapping manner for the downlink control channel in the first downlink control channel region includes a centralized mapping manner or a distributed mapping manner.

Optionally, the configuration information of the first downlink control channel region includes the first indication information; and the resource indication information of the first downlink control channel region indicates a resource that is in the first downlink control channel region and that is available for downlink data transmission; or the resource indication information of the first downlink control channel region indicates a resource that is in the first downlink control channel region and that is not available for downlink data transmission; or the resource indication information of the first downlink control channel region indicates a resource that is in the first downlink control channel region and that is occupied by a downlink control channel; or the resource indication information of the first downlink control channel region indicates a resource that is in the first downlink control channel region and that is not occupied by a downlink control channel.

Optionally, the configuration information of the first downlink control channel region further includes sixth indication information, wherein the sixth indication information indicates a quantity of bits of the resource indication information of the first downlink control channel region, where the resource indication information of the first downlink control channel region is included in the downlink scheduling information.

Optionally, after the sending, by the network device, the configuration information of the N downlink control channel regions, the method further includes: determining, by the network device, a resource occupied by downlink data; sending, by the network device, the downlink scheduling information, where the downlink scheduling information is carried on one or more downlink control channels in the N downlink control channel regions, and the downlink scheduling information is used to schedule the downlink data transmission; and sending, by the network device, the downlink data on the resource occupied by the downlink data.

Optionally, the configuration information of the first downlink control channel region includes the first indication information, and the determining, by the network device, a resource occupied by downlink data includes:

determining, by the network device, that the resource occupied by the downlink data does not include the resource that is indicated by the resource indication information of the first downlink control channel region and that is not available for the downlink data transmission, where the first indication information indicates that the downlink scheduling information includes the resource indication information of the first downlink control channel region, and/or the quantity of bits of the resource indication information of the first downlink control channel region that is comprised in the downlink scheduling information and that is indicated by the sixth indication information is a positive integer; or determining, by the network device, that the resource occupied by the downlink data does not include a resource corresponding to the first downlink control channel region, where the first indication information indicates that the downlink scheduling information does not include the resource indication information of the first downlink control channel region, and/or the quantity of bits of the resource indication information of the first downlink control channel region that is included in the downlink scheduling information and that is indicated by the sixth indication information is 0.

Optionally, the configuration information of the first downlink control channel region includes the fifth indication information; and the fifth indication information indicates that the mapping manner for the downlink control channel in the first downlink control channel region is the centralized mapping manner, and the network device determines that the quantity of symbols occupied by the first downlink control channel region in time domain is 1, 2, or 3; or the fifth indication information indicates that the mapping manner for the downlink control channel in the first downlink control channel region is the distributed mapping manner, and the network device determines that the quantity of symbols occupied by the first downlink control channel region in time domain is 1.

Optionally, the configuration information of the first downlink control channel region further includes seventh indication information, and the seventh indication information indicates a scheduling information type of downlink control information DCI transmitted in a search space in the first downlink control channel region; or the configuration information of the first downlink control channel region further includes eighth indication information, and the eighth indication information indicates a scheduling information type of downlink control information transmitted in the first downlink control channel region, where the scheduling information type includes uplink scheduling information or downlink scheduling information.

Optionally, the N downlink control channel regions include a second downlink control channel region, the configuration information of the N downlink control channel regions includes configuration information of the second downlink control channel region, and the configuration information of the second downlink control channel region includes at least one of eleventh indication information, twelfth indication information, thirteenth indication information, fourteenth indication information, and fifteenth indication information;

the eleventh indication information indicates whether the downlink scheduling information includes resource indication information of the second downlink control channel region;

the twelfth indication information indicates a quantity of search spaces in the second downlink control channel region, wherein the quantity of search spaces in the second downlink control channel region is 0 or a positive integer;

the thirteenth indication information indicates a quantity of symbols occupied by the second downlink control channel region in time domain, the quantity of symbols occupied by the second downlink control channel region in time domain is a positive integer less than or equal to 7, and the quantity of symbols occupied by the second downlink control channel region in time domain is different from the quantity of symbols occupied by the first downlink control channel region in time domain;

the fourteenth indication information indicates a time length of data transmission corresponding to the second downlink control channel region, and the time length of data transmission corresponding to the second downlink control channel region is different from the time length of data transmission corresponding to the first downlink control channel region; and the fifteenth indication information indicates a mapping manner for a downlink control channel in the second downlink control channel region, wherein the mapping manner for the downlink control channel in the second downlink control channel region includes the centralized mapping manner or the distributed mapping manner.

According to a third aspect, a terminal device is provided, including a processor and a transceiver, where the transceiver is in communication connection with the processor;

the transceiver is configured to receive configuration information of N downlink control channel regions, where the N downlink control channel regions include a first downlink control channel region, the configuration information of the N downlink control channel regions includes configuration information of the first downlink control channel region, and N is a positive integer;

the processor is configured to determine the N downlink control channel regions based on the configuration information of the N downlink control channel regions, where the configuration information of the first downlink control channel region includes at least one of first indication information, second indication information, third indication information, fourth indication information, and fifth indication information, wherein the first indication information indicates whether downlink scheduling information includes resource indication information of the first downlink control channel region;

the second indication information indicates a quantity of search spaces in the first downlink control channel region, wherein the quantity of search spaces in the first downlink control channel region is 0 or a positive integer;

the third indication information indicates a quantity of symbols occupied by the first downlink control channel region in time domain, wherein the quantity of symbols occupied by the first downlink control channel region in time domain is a positive integer less than or equal to 7;

the fourth indication information indicates a time length of data transmission corresponding to the first downlink control channel region; and the fifth indication information indicates a mapping manner for a downlink control channel in the first downlink control channel region, wherein the mapping manner for the downlink control channel in the first downlink control channel region includes a centralized mapping manner or a distributed mapping manner.

Optionally, the configuration information of the first downlink control channel region includes the first indication information; and the resource indication information of the first downlink control channel region indicates a resource that is in the first downlink control channel region and that is available for downlink data transmission; or the resource indication information of the first downlink control channel region indicates a resource that is in the first downlink control channel region and that is not available for downlink data transmission; or the resource indication information of the first downlink control channel region indicates a resource that is in the first downlink control channel region and that is occupied by a downlink control channel; or the resource indication information of the first downlink control channel region indicates a resource that is in the first downlink control channel region and that is not occupied by a downlink control channel.

Optionally, the configuration information of the first downlink control channel region further includes sixth indication information, wherein the sixth indication information indicates a quantity of bits of the resource indication information of the first downlink control channel region, where the resource indication information of the first downlink control channel region is included in the downlink scheduling information.

Optionally, the transceiver is further configured to receive the downlink scheduling information, where the downlink scheduling information is carried on one or more downlink control channels in the N downlink control channel regions; and the processor is further configured to determine, based on the downlink scheduling information, a resource occupied by downlink data.

Optionally, the downlink scheduling information includes frequency domain resource information for the downlink data, and the configuration information of the first downlink control channel region includes the first indication information; and that the processor is further configured to determine, based on the downlink scheduling information, a resource occupied by downlink data includes:

the first indication information indicates that the downlink scheduling information includes the resource indication information of the first downlink control channel region, and/or the quantity of bits of the resource indication information of the first downlink control channel region that is comprised in the downlink scheduling information and that is indicated by the sixth indication information is a positive integer; and the processor is further configured to determine, based on the frequency domain resource information for the downlink data and the resource indication information of the first downlink control channel region, the resource occupied by the downlink data; or the first indication information indicates that the downlink scheduling information does not include the resource indication information of the first downlink control channel region, and/or the quantity of bits of the resource indication information of the first downlink control channel region that is comprised in the downlink scheduling information and that is indicated by the sixth indication information is 0; and the processor is further configured to determine that the resource occupied by the downlink data does not include a resource corresponding to the first downlink control channel region.

Optionally, the configuration information of the first downlink control channel region includes the fifth indication information; and the fifth indication information indicates that the mapping manner for the downlink control channel in the first downlink control channel region is the centralized mapping manner, and the terminal device determines that the quantity of symbols occupied by the first downlink control channel region in time domain is 1, 2, or 3; or the fifth indication information indicates that the mapping manner for the downlink control channel in the first downlink control channel region is the distributed mapping manner, and the terminal device determines that the quantity of symbols occupied by the first downlink control channel region in time domain is 1.

Optionally, the configuration information of the first downlink control channel region further includes seventh indication information, and the seventh indication information indicates a scheduling information type of downlink control information DCI transmitted in a search space in the first downlink control channel region; or the configuration information of the first downlink control channel region further includes eighth indication information, and the eighth indication information indicates a scheduling information type of downlink control information transmitted in the first downlink control channel region, where the scheduling information type includes uplink scheduling information or downlink scheduling information.

Optionally, the N downlink control channel regions include a second downlink control channel region, the configuration information of the N downlink control channel regions includes configuration information of the second downlink control channel region, and the configuration information of the second downlink control channel region includes at least one of eleventh indication information, twelfth indication information, thirteenth indication information, fourteenth indication information, and fifteenth indication information;

the eleventh indication information indicates that the downlink scheduling information includes or does not include resource indication information of the second downlink control channel region;

the twelfth indication information indicates a quantity of search spaces in the second downlink control channel region, wherein the quantity of search spaces in the second downlink control channel region is 0 or a positive integer;

the thirteenth indication information indicates a quantity of symbols occupied by the second downlink control channel region in time domain, the quantity of symbols occupied by the second downlink control channel region in time domain is a positive integer less than or equal to 7, and the quantity of symbols occupied by the second downlink control channel region in time domain is different from the quantity of symbols occupied by the first downlink control channel region in time domain;

the fourteenth indication information indicates a time length of data transmission corresponding to the second downlink control channel region, and the time length of data transmission corresponding to the second downlink control channel region is different from the time length of data transmission corresponding to the first downlink control channel region; and the fifteenth indication information indicates a mapping manner for a downlink control channel in the second downlink control channel region, wherein the mapping manner for the downlink control channel in the second downlink control channel region includes the centralized mapping manner or the distributed mapping manner.

According to a fourth aspect, a network device is provided, including a processor and a transceiver, where the transceiver is in communication connection with the processor;

the processor is configured to determine configuration information of N downlink control channel regions, where the N downlink control channel regions include a first downlink control channel region, the configuration information of the N downlink control channel regions includes configuration information of the first downlink control channel region, and N is a positive integer;

the transceiver is configured to send the configuration information of the N downlink control channel regions;

the configuration information of the first downlink control channel region includes at least one of first indication information, second indication information, third indication information, fourth indication information, and fifth indication information, wherein the first indication information indicates whether downlink scheduling information includes resource indication information of the first downlink control channel region;

the second indication information indicates a quantity of search spaces in the first downlink control channel region, wherein the quantity of search spaces in the first downlink control channel region is 0 or a positive integer;

the third indication information indicates a quantity of symbols occupied by the first downlink control channel region in time domain, wherein the quantity of symbols occupied by the first downlink control channel region in time domain is a positive integer less than or equal to 7;

the fourth indication information indicates a time length of data transmission corresponding to the first downlink control channel region; and the fifth indication information indicates a mapping manner for a downlink control channel in the first downlink control channel region, wherein the mapping manner for the downlink control channel in the first downlink control channel region includes a centralized mapping manner or a distributed mapping manner.

Optionally, the configuration information of the first downlink control channel region includes the first indication information; and the resource indication information of the first downlink control channel region indicates a resource that is in the first downlink control channel region and that is available for downlink data transmission; or the resource indication information of the first downlink control channel region indicates a resource that is in the first downlink control channel region and that is not available for downlink data transmission; or the resource indication information of the first downlink control channel region indicates a resource that is in the first downlink control channel region and that is occupied by a downlink control channel; or the resource indication information of the first downlink control channel region indicates a resource that is in the first downlink control channel region and that is not occupied by a downlink control channel.

Optionally, the configuration information of the first downlink control channel region further includes sixth indication information, wherein the sixth indication information indicates a quantity of bits of the resource indication information of the first downlink control channel region, where the resource indication information of the first downlink control channel region is included in the downlink scheduling information.

Optionally, the processor is further configured to determine a resource occupied by downlink data; the transceiver is further configured to send the downlink scheduling information, where the downlink scheduling information is carried on one or more downlink control channels in the N downlink control channel regions, and the downlink scheduling information is used to schedule the downlink data transmission; and the transceiver is further configured to send the downlink data on the resource occupied by the downlink data.

Optionally, the configuration information of the first downlink control channel region includes the first indication information; and that the processor is further configured to determine a resource occupied by downlink data includes:

the first indication information indicates that the downlink scheduling information includes the resource indication information of the first downlink control channel region, and/or the quantity of bits of the resource indication information of the first downlink control channel region that is comprised in the downlink scheduling information and that is indicated by the sixth indication information is a positive integer; and the processor is further configured to determine that the resource occupied by the downlink data does not include the resource that is indicated by the resource indication information of the first downlink control channel region and that is not available for the downlink data transmission; or the first indication information indicates that the downlink scheduling information does not include the resource indication information of the first downlink control channel region, and/or the quantity of bits of the resource indication information of the first downlink control channel region that is comprised in the downlink scheduling information and that is indicated by the sixth indication information is 0; and the processor is further configured to determine that the resource occupied by the downlink data does not include a resource corresponding to the first downlink control channel region.

Optionally, the configuration information of the first downlink control channel region includes the fifth indication information; and the fifth indication information indicates that the mapping manner for the downlink control channel in the first downlink control channel region is the centralized mapping manner, and the network device determines that the quantity of symbols occupied by the first downlink control channel region in time domain is 1, 2, or 3; or the fifth indication information indicates that the mapping manner for the downlink control channel in the first downlink control channel region is the distributed mapping manner, and the network device determines that the quantity of symbols occupied by the first downlink control channel region in time domain is 1.

Optionally, the configuration information of the first downlink control channel region further includes seventh indication information, and the seventh indication information indicates a scheduling information type of downlink control information DCI transmitted in a search space in the first downlink control channel region; or the configuration information of the first downlink control channel region further includes eighth indication information, and the eighth indication information indicates a scheduling information type of downlink control information transmitted in the first downlink control channel region, where the scheduling information type includes uplink scheduling information or downlink scheduling information.

Optionally, the N downlink control channel regions include a second downlink control channel region, the configuration information of the N downlink control channel regions includes configuration information of the second downlink control channel region, and the configuration information of the second downlink control channel region includes at least one of eleventh indication information, twelfth indication information, thirteenth indication information, fourteenth indication information, and fifteenth indication information;

the eleventh indication information indicates that the downlink scheduling information includes or does not include resource indication information of the second downlink control channel region;

the twelfth indication information indicates a quantity of search spaces in the second downlink control channel region, wherein the quantity of search spaces in the second downlink control channel region is 0 or a positive integer;

the thirteenth indication information indicates a quantity of symbols occupied by the second downlink control channel region in time domain, the quantity of symbols occupied by the second downlink control channel region in time domain is a positive integer less than or equal to 7, and the quantity of symbols occupied by the second downlink control channel region in time domain is different from the quantity of symbols occupied by the first downlink control channel region in time domain;

the fourteenth indication information indicates a time length of data transmission corresponding to the second downlink control channel region, and the time length of data transmission corresponding to the second downlink control channel region is different from the time length of data transmission corresponding to the first downlink control channel region; and the fifteenth indication information indicates a mapping manner for a downlink control channel in the second downlink control channel region, wherein the mapping manner for the downlink control channel in the second downlink control channel region includes the centralized mapping manner or the distributed mapping manner.

The embodiments of the present invention can be used to flexibly configure a downlink control channel region, to flexibly use a downlink resource. The network device may flexibly indicate, by using the first indication information and/or the sixth indication information, whether the downlink scheduling information includes the resource indication information of the first downlink control channel region, to properly adjust between downlink control channel overheads and overheads of the downlink scheduling information based on a current situation. The network device may adaptively adjust the quantity of bits of the resource indication information by configuring the sixth indication information, to adaptively adjust the overheads of the downlink scheduling information. The network device may configure the quantity of search spaces to 0 by using the second indication information, to reduce limitations on a frequency domain resource occupied by the downlink data, so that the frequency domain resource may be allocated in a relatively large band range. The network device may adaptively configure, by using the fourth indication information, the time length of data transmission corresponding to the current first downlink control channel region, to meet a requirement of data transmission with a plurality of TTI lengths in a system. To simultaneously achieve different advantages, the network device may configure different quantities of symbols in different downlink control channel regions. For example, the network device may simultaneously configure the centralized mapping manner and the distributed mapping manner, to configure different quantities of symbols. For example, the network device may configure different control channel regions to correspond to different time length of data transmissions, to configure different quantities of symbols.

DESCRIPTION OF EMBODIMENTS

Figure 1:
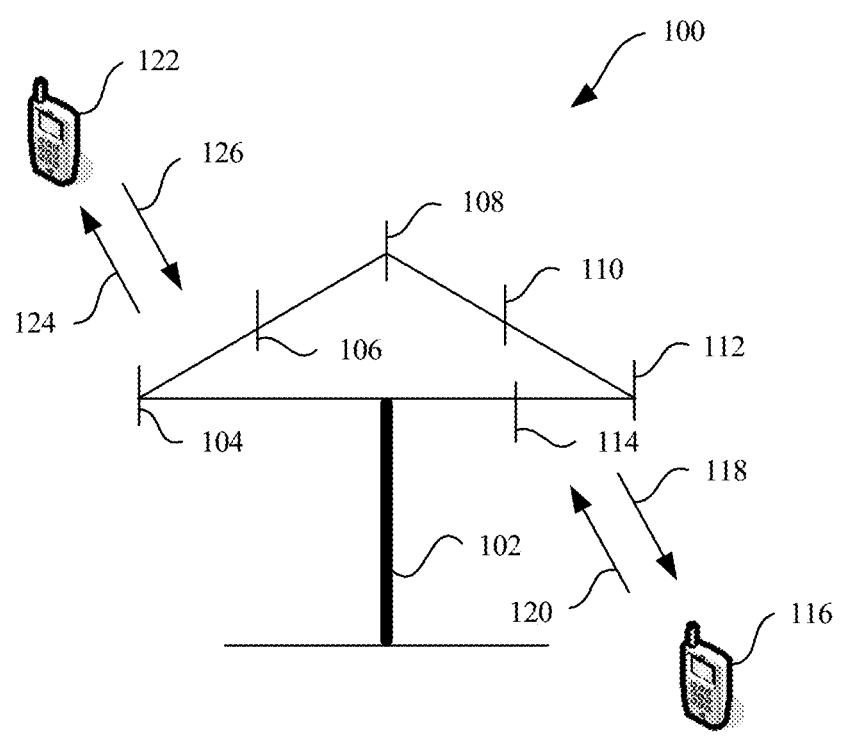
FIG. 1 is a schematic architectural diagram of a communications system applicable to an information sending method and apparatus and an information receiving method and apparatus according to embodiments of the present invention.

To facilitate understanding of solutions in embodiments of the present invention, basic concepts in the embodiments of the present invention are first described. It should be noted that, the embodiments of the present invention are described by using an LTE system as an example, but this does not mean that the embodiments of the present invention are applicable only to the LTE system. Actually, the technical solutions provided in the embodiments of the present invention may be applied to any wireless communications system that performs data transmission through scheduling.

1. Frame Structure

A radio frame in the LTE system includes 10 subframes, a length of each subframe is 1 millisecond (ms), each subframe includes two slots, and each slot is 0.5 ms.

A quantity of symbols included in each slot is related to a length of a cyclic prefix (CP) in the subframe. If the CP is a normal CP, each slot includes seven symbols, and each subframe includes 14 symbols; for example, each subframe includes symbols numbered #0, #1, #2, #3, #4, #5, #6, #7, #8, #9, #10, #11, #12, and #13. If the CP is an extended (extended) CP, each slot includes six symbols, and each subframe includes 12 symbols; for example, each subframe includes symbols numbered #0, #1, #2, #3, #4, #5, #6, #7, #8, #9, #10, and #11. In a future evolved system, a subcarrier spacing may be increased, and a length of a subframe may be shortened. For example, the length of each subframe is shortened to 0.2 ms, 0.5 ms, or shorter. A quantity of symbols included in a slot may change, or a length of a slot may change. For example, the length of the slot becomes shorter.

A time length of a subframe and a time length of a symbol are not limited in this application. Without loss of generality, a subframe includes A symbols, and A is a positive integer; in other words, an uplink subframe includes A uplink symbols, or a subframe includes A downlink symbols. Likewise, a slot includes B symbols, and B is a positive integer. The uplink symbol and the downlink symbol are both referred to as symbols. The uplink symbol is referred to as a single carrier frequency division multiple access (SC-FDMA) symbol. The downlink symbol is referred to as an orthogonal frequency division multiplexing (OFDM) symbol. It should be noted that, if an orthogonal frequency division multiple access (OFDMA) uplink multiple access manner is introduced into a subsequent technology, the uplink symbol may alternatively be referred to as another type of symbol, for example, an OFDM symbol. The uplink multiple access manner and a downlink multiple access manner are not limited in this application.

2. Resource Element

A resource element (RE) is a minimum unit in time domain and frequency domain, and is uniquely identified by an index pair (k, l), where k is a subcarrier index, and l is a symbol index. Certainly, the resource element may alternatively be identified by using an identifier in another form.

3. Downlink Control Channel, Downlink Control Channel Region, and Search Space

A downlink control channel is a channel used to carry DCI; in other words, DCI is carried on a downlink control channel. The downlink control channel may be a PDCCH, an EPDCCH, an sPDCCH, an NR-PDCCH, or a channel that is defined in a future release to carry DCI. The sPDCCH (a PDCCH for a short TTI, or a shortened PDCCH) is a downlink control channel that occupies a time domain resource less than or equal to 0.5 ms. The NR-PDCCH (new radio PDCCH) is a downlink control channel defined in a 5G NR system. A type and a name of the downlink control channel are not limited in the embodiments of the present invention.

Optionally, the downlink control channel is formed by L downlink control channel elements (CCE) through aggregation. L is a positive integer, and is referred to as aggregation level (AL). For example, L may be 1, 2, 4, or 8.

A downlink control channel region is a region that may be occupied by the downlink control channel. The downlink control channel region includes one or more downlink control channel elements, and each downlink control channel in the downlink control channel region is formed by one or more downlink control channel elements in the downlink control channel region. A resource occupied by downlink control channel region may be defined by using a time domain resource and a frequency domain resource.

A search space is formed by one or more downlink control channel candidates through combination, and each downlink control channel candidate can be used to carry DCI. In short, the search space is a set of downlink control channel candidates. A terminal device needs to listen to a downlink control channel candidate. Therefore, the search space is a set of downlink control channel candidates that the terminal device listens to. Optionally, the search space may be a search space specific to the terminal device; in other words, the search space is configured for the terminal device. In the embodiments of the present invention, the search space is located in the downlink control channel region.

4. TTI Length

Currently, physical channels in the LTE system are all designed based on a TTI length of 1 ms. It should be noted that, although the TTI length is 1 ms, a time domain resource occupied by data transmission may be less than 1 ms. For example, the first one, two, three, or four symbols in a downlink subframe may be used to transmit a PDCCH. Therefore, a time domain resource occupied by downlink data transmission whose TTI length is 1 ms may be less than 1 ms. For another example, a last symbol in an uplink subframe may be used to transmit an sounding reference signal (SRS). Therefore, a time domain resource occupied by uplink data transmission whose TTI length is 1 ms may also be less than 1 ms.

Data transmission with short TTI is data transmission whose TTI length is less than one subframe or 1 ms. For example, a length of a short TTI is 0.5 ms, a length of four symbols, a length of three symbols, a length of two symbols, or a length of one symbol. Likewise, a time domain resource occupied by the data transmission with short TTI may also be less than or equal to the length of the short TTI. For example, for downlink data transmission whose TTI length is three symbols, if the three symbols include one PDCCH symbol, the downlink data transmission occupies only two symbols.

5. Available Bandwidth

In this application, available bandwidth may be downlink system bandwidth, or bandwidth used for downlink data transmission with short TTI, or bandwidth used for downlink control channel transmission. The downlink data transmission with short TTI is downlink data transmission that occupies a time domain resource less than 1 ms. The bandwidth used for the downlink data transmission with short TTI may be configured for use by one terminal device, or configured for use by a group of terminal devices. The available bandwidth may be predefined, or notified by using higher layer signaling.

The following describes implementations in the embodiments of the present invention in detail with reference to the accompanying drawings of this specification.

The embodiments of the present invention provide an information sending method and apparatus and an information receiving method and apparatus, to flexibly configure a downlink control channel region.

The embodiments of the present invention may be applied to various communications systems, for example, a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, and a subsequent evolved system such as a fifth generation 5G system.

The embodiments of the present invention may be applied to a wireless communications system including a network device and a terminal device (terminal device or terminal equipment). The terminal device may be a device that provides a user with voice and/or data connectivity, a handheld device with a wireless connection function, or another processing device connected to a wireless modem. The wireless terminal may communicate with one or more core networks by using a radio access network (for example, Radio Access Network, RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, an access point, a remote terminal, an access terminal, a user terminal, a user agent, a user device, or user equipment. The network device may be a base station, an enhanced base station, a relay with a scheduling function, a device with a base station function, or the like. The base station may be an evolved NodeB (eNB or eNodeB) in the LTE system, or a base station in another system. This is not limited in the embodiments of the present invention.

FIG. 1 is a schematic architectural diagram of a wireless communications system according to an embodiment of the present invention. As shown in FIG. 1, the communications system 100 includes a network device 102. The network device 102 may include one or more antennas, for example, antennas 104, 106, 108, 110, 112, and 114. In addition, the network device 102 may additionally include a transmitter chain and a receiver chain. A person of ordinary skill in the art may understand that, the transmitter chain and the receiver chain may each include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that, the network device 102 may communicate with any quantity of terminal devices similar to the terminal device 116 or the terminal device 122. The terminal devices 116 and 122 may be, for example, a cellular phone, a smartphone, a portable computer, a handheld communications device, a handheld computing device, a satellite radio apparatus, a global positioning system, a PDA, and/or any other suitable device used for communication in the wireless communications system 100.

As shown in FIG. 1, the terminal device 116 communicates with the antennas 112 and 114. The antennas 112 and 114 send information to the terminal device 116 by using a forward link (also referred to as a downlink link) 118, and receive information from the terminal device 116 by using a reverse link (also referred to as an uplink link) 120. In addition, the terminal device 122 communicates with the antennas 104 and 106. The antennas 104 and 106 send information to the terminal device 122 by using a forward link 124, and receive information from the terminal device 122 by using a reverse link 126.

In addition, the communications system 100 may be a PLMN network, a D2D network, an M2M network, or another network. FIG. 1 is only an example of a simplified schematic diagram. The network may further include another network device not shown in FIG. 1.

Figure 2:
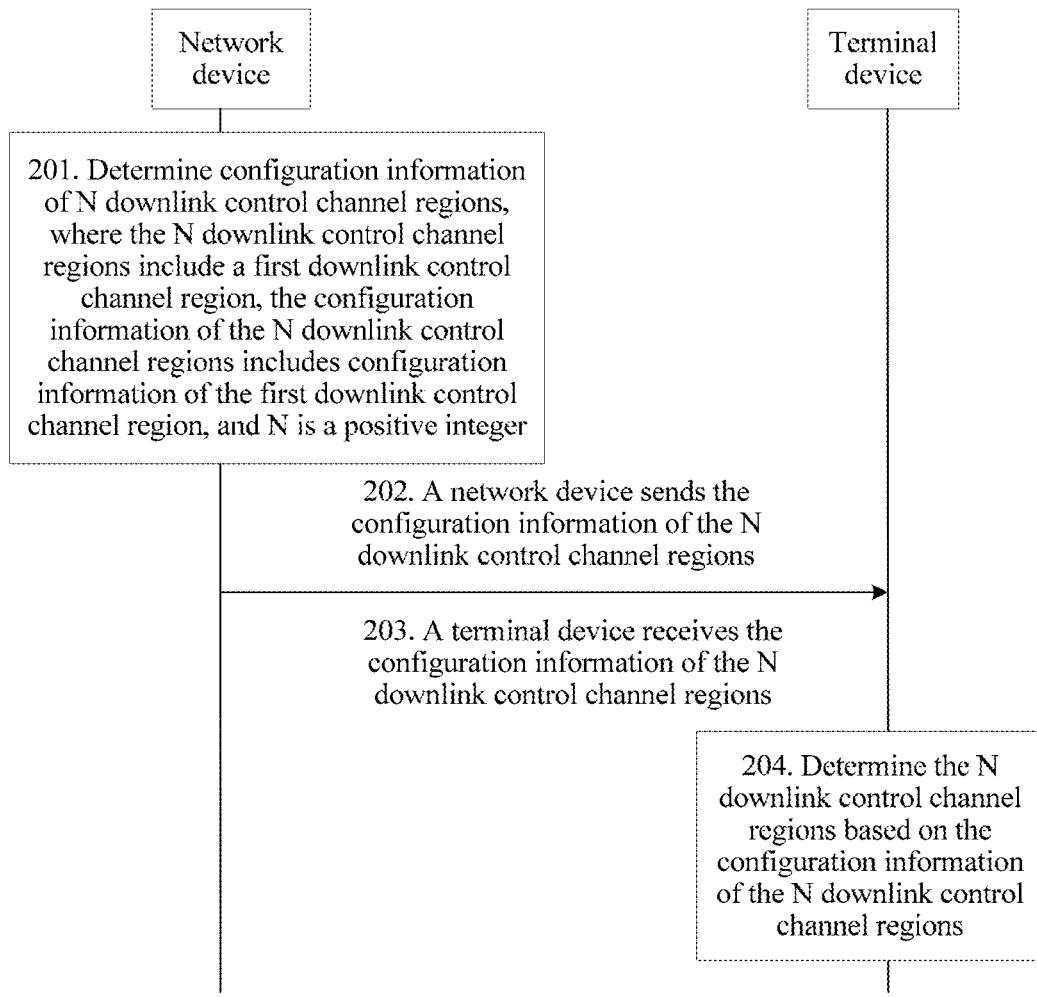
FIG. 2 is a schematic diagram of an interaction process of information sending and information receiving according to an embodiment of the present invention.

FIG. 2 is a schematic diagram of an interaction process of information sending and information receiving according to an embodiment of the present invention. It should be noted that, the embodiment in FIG. 2 is described by using an example in which a network device sends information to a terminal device and the terminal device receives the information from the network device, but the embodiments of the present invention are not limited thereto, and the technical solutions provided in the embodiments of the present invention are applicable to any communication scenario of information sending and/or receiving.

Step 201. The network device determines configuration information of N downlink control channel regions, where the N downlink control channel regions include a first downlink control channel region, the configuration information of the N downlink control channel regions includes configuration information of the first downlink control channel region, N is a positive integer, and the configuration information of the first downlink control channel region includes at least one of first indication information, second indication information, third indication information, fourth indication information, and fifth indication information.

The first indication information indicates whether downlink scheduling information includes resource indication information of the first downlink control channel region.

The second indication information indicates a quantity of search spaces in the first downlink control channel region, wherein the quantity of search spaces in the first downlink control channel region is 0 or a positive integer.

The third indication information indicates a quantity of symbols occupied by the first downlink control channel region in time domain, wherein the quantity of symbols occupied by the first downlink control channel region in time domain is a positive integer less than or equal to 7.

The fourth indication information indicates a time length of data transmission corresponding to the first downlink control channel region.

The fifth indication information indicates a mapping manner for a downlink control channel in the first downlink control channel region, wherein the mapping manner for the downlink control channel in the first downlink control channel region includes a centralized mapping manner or a distributed mapping manner.

Step 202. The network device sends the configuration information of the N downlink control channel regions.

Step 203. The terminal device receives the configuration information of the N downlink control channel regions.

Step 204. The terminal device determines the N downlink control channel regions based on the configuration information of the N downlink control channel regions.

The network device may configure one downlink control channel region for one terminal device, or may configure a plurality of downlink control channel regions for the terminal device. Certainly, the network device may further configure, for a plurality of terminal devices served by the network device, a same downlink control channel region or a plurality of different downlink control channel regions.

In this embodiment of the present invention, N is a positive integer. For example, N=1, and the network device determines configuration information of only one downlink control channel region, namely, the configuration information of the first downlink control channel region. For example, N>1 (for example, N is equal to 2), the network device determines the configuration information of the N downlink control channel regions, and the configuration information of the N downlink control channel regions includes the configuration information of the first downlink control channel region and configuration information of the other (N−1) downlink control channel regions.

It should be noted that, this embodiment of the present invention is mainly described by using the first downlink control channel region of the N downlink control channel regions as an example. Without loss of generality, the first downlink control channel region may be any one of the N downlink control channel regions.

It should be noted that, the network device may separately determine configuration information of any one of the N downlink control channel regions, or may determine configuration information of some downlink control channel regions jointly. This is not limited in this embodiment of the present invention.

If N>1, sequences of determining and sending the configuration information of the N downlink control channel regions by the network device are not limited in this embodiment of the present invention. Likewise, a sequence of receiving the configuration information of the N downlink control channel regions by the terminal device and a sequence of determining the N downlink control channel regions by the terminal device are not limited in this embodiment of the present invention, either. For example, the network device simultaneously sends the configuration information of the N downlink control channel regions, and correspondingly, the terminal device may simultaneously receive the configuration information of the N downlink control channel regions. For another example, the network device sends the configuration information of the N downlink control channel regions at different moments, and correspondingly, the terminal device may receive the configuration information of the N downlink control channel regions at different moments.

The configuration information of the N downlink control channel regions is carried in one or more pieces of signaling. For example, N is equal to 1, and the configuration information of the one downlink control channel region is carried in one or more pieces of signaling. For example, N is greater than 1, and the configuration information of the N downlink control channel regions is carried in one or more pieces of signaling. Optionally, the one or more pieces of signaling are all higher layer signaling. Optionally, in the plurality of pieces of signaling, some signaling is higher layer signaling, and some signaling is physical layer signaling. Correspondingly, the network device may send the configuration information of the N downlink control channel regions to the terminal device by using the one or more pieces of signaling, and correspondingly, the terminal device may obtain the configuration information of the N downlink control channel regions by receiving the one or more pieces of signaling. The higher layer signaling is signaling that is from a higher layer and that has a lower sending frequency than the physical layer signaling, and includes Radio Resource Control (RRC) signaling and Media Access Control (MAC) signaling.

In an optional embodiment, step 205 and step 206 may be further included. In step 205, the network device determines a resource occupied by downlink data, and sends the downlink scheduling information and the downlink data. Correspondingly, in step 206, the terminal device receives the downlink scheduling information, and determines, based on the downlink scheduling information, the resource occupied by the downlink data, to obtain the downlink data on the resource occupied by the downlink data. The downlink scheduling information is used to schedule downlink data transmission, the downlink scheduling information includes indication information of the resource occupied by the downlink data, and the downlink scheduling information is carried on one or more downlink control channels in the N downlink control channel regions. It should be noted that, all substeps of step 205 may be performed after step 204, or the first one or more substeps of step 205 may be performed before step 204. This is not limited in this embodiment of the present invention. Step 206 is performed after step 205. The downlink data is carried on a physical downlink shared channel (PDSCH). If a time domain resource occupied by the PDSCH is less than or equal to 0.5 ms, the PDSCH may also be referred to as an sPDSCH (shortened PDSCH). In a 5G NR system, the PDSCH may also be referred to as an NR-PDSCH (new radio PDSCH). A name of the PDSCH is not limited in this embodiment of the present invention.

The resource that is indicated by the downlink scheduling information and that is occupied by the downlink data does not include a resource that is outside the N downlink control channel regions (a region other than the N downlink control channel regions is referred to as a region D) and that is configured for occupation by a downlink control channel of another terminal device, and the another terminal device and the terminal device are different terminal devices. Therefore, the terminal device needs to know only a resource that is in the N downlink control channel regions and that is occupied by a downlink control channel; or in other words, the terminal device needs to know only a resource that is in the N downlink control channel regions and that is available for the downlink data transmission. The terminal device does not need to learn a resource that is in the region D and that is occupied by a downlink control channel. The region D is any other downlink control channel region, and the any other downlink control channel region does not overlap any one of the N downlink control channel regions in resource. Alternatively, the region D is a part that is of any other downlink control channel region and that does not overlap the N downlink control channel regions, and the any other downlink control channel region is configured for the another terminal device. It should be noted that, when the N downlink control channel regions overlap any other downlink control channel region in resource, if an overlapping region includes a resource used by a downlink control channel, usage in an overlapping part may be learned by indicating resource usage in the N downlink control channel regions, so that resource usage in the any other downlink control channel region does not need to be additionally learned. The resource that is in the N downlink control channel regions and that is occupied by the downlink control channel cannot be used for the downlink data transmission. In other words, the terminal device does not expect to receive the downlink data on the resource that is in the N downlink control channel regions and that is occupied by the downlink control channel. Correspondingly, the network device does not transmit the downlink data on the resource that is in the N downlink control channel regions and that is occupied by the downlink control channel. Optionally, the "resource occupied by the downlink control channel" may be an "RE occupied by the downlink control channel", the "resource for the downlink data transmission" may be an "RE for the downlink data transmission", and the "resource occupied by the downlink data" may be an "RE occupied by the downlink data".

In an optional embodiment, the configuration information of the first downlink control channel region includes the first indication information, and the first indication information indicates whether the downlink scheduling information includes the resource indication information of the first downlink control channel region. For example, the first indication information indicates that the downlink scheduling information includes the resource indication information of the first downlink control channel region, so that the terminal device determines, based on the first indication information, that the downlink scheduling information includes the resource indication information of the first downlink control channel region. For example, the first indication information indicates that the downlink scheduling information does not include the resource indication information of the first downlink control channel region, so that the terminal device determines, based on the first indication information, that the downlink scheduling information does not include the resource indication information of the first downlink control channel region. Optionally, the first indication information is carried in higher layer signaling. Optionally, the first indication information is carried in physical layer signaling, for example, carried on a PDCCH defined in LTE Rel-8 (release-8).

The resource indication information of the first downlink control channel region is subject to definition 1 or definition 2.

Definition 1: The resource indication information of the first downlink control channel region indicates a resource that is in the first downlink control channel region and that is not available for the downlink data transmission. The resource that is in the first downlink control channel region and that is not available for the downlink data transmission includes a resource that is in the first downlink control channel region and that is occupied by the downlink control channel; in other words, the "resource that is not available for the downlink data transmission" is greater than or equal to the "resource that is occupied by the downlink control channel". For example, to reduce a quantity of bits used by the resource indication information, a granularity of the resource indicated by the resource indication information may be insufficiently fine. Consequently, the resource that is indicated by the resource indication information and that is not available for the downlink data transmission is greater than the resource that is occupied by the downlink control channel. To avoid a waste of resources, the resource that is indicated by the resource indication information and that is not available for the downlink data transmission should be as equal as possible to or slightly greater than the resource that is occupied by the downlink control channel. Therefore, the "resource that is not available for the downlink data transmission" may also be referred to as the "resource that is occupied by the downlink control channel".

Definition 2: The resource indication information of the first downlink control channel region indicates a resource that is in the first downlink control channel region and that is available for the downlink data transmission. Likewise, the resource that is indicated by the resource indication information and that is available for the downlink data transmission should be as equal as possible to or slightly less than a resource that is not occupied by the downlink control channel. Therefore, the "resource that is available for the downlink data transmission" may also be referred to as the "resource that is not occupied by the downlink control channel".

In an optional embodiment, the configuration information of the first downlink control channel region includes sixth indication information, and the sixth indication information indicates a quantity of bits of the resource indication information of the first downlink control channel region, where the resource indication information of the first downlink control channel region is included in the downlink scheduling information. Optionally, the quantity of bits is a positive integer. Optionally, the quantity of bits is 0 or a positive integer. When the sixth indication information indicates that the quantity of bits of the resource indication information of the first downlink control channel region that is included in the downlink scheduling information is 0, it indicates that the downlink scheduling information does not include the resource indication information of the first downlink control channel region. The network device may adaptively adjust overheads of the downlink scheduling information by configuring the quantity of bits of the resource indication information. For example, to enhance performance of the downlink scheduling information, a relatively small quantity of bits may be configured. To finely indicate a resource, a relatively large quantity of bits may be configured.

For example, the sixth indication information indicates the quantity of bits of the resource indication information by using Q bits. It is assumed that a value of each bit is 0 or 1.

When Q=1, and a value of the one bit is 0, it means that the downlink scheduling information does not include the resource indication information of the first downlink control channel region. When a value of the one bit is 1, it means that the downlink scheduling information includes the resource indication information of the first downlink control channel region. It is assumed that a value of each bit is 0 or 1. For example, when Q=3 and a value of the three bits is "000", it means that the downlink scheduling information does not include the resource indication information of the first downlink control channel region. When the three bits are not "000", it means that the downlink scheduling information includes the resource indication information of the first downlink control channel region, and a value of the three bits indicates the quantity of bits of the resource indication information of the first downlink control channel region. For example, if the value of the three bits is "110", the quantity of bits of the resource indication information of the first downlink control channel region is 6. For example, if the value of the three bits is "111", the quantity of bits of the resource indication information of the first downlink control channel region is 7.

If the first indication information indicates that the downlink scheduling information includes the resource indication information of the first downlink control channel region, or the sixth indication information indicates that the quantity of bits of the resource indication information of the first downlink control channel region is a positive integer, where the resource indication information of the first downlink control channel region is included in the downlink scheduling information, the downlink scheduling information includes the resource indication information of the first downlink control channel region and frequency domain resource information for the downlink data (note: the resource indication information of the first downlink control channel region and the frequency domain resource information for the downlink data may be jointly used for indication, or may be separately used for indication, and this is not limited in this embodiment of the present invention). The determining, by the terminal device based on the downlink scheduling information, the resource occupied by the downlink data in step 206 is specifically: determining, by the terminal device based on the frequency domain resource information for the downlink data and the resource indication information of the first downlink control channel region, the resource occupied by the downlink data, and includes the following steps:

determining, by the terminal device based on the frequency domain resource information for the downlink data, an initial resource occupied by the downlink data;

determining, by the terminal device based on the resource indication information of the first downlink control channel region, the resource that is in the first downlink control channel region and that is not available for the downlink data transmission; and determining, by the terminal device, that the resource occupied by the downlink data (namely, an actually occupied resource) is a remaining resource obtained by subtracting the resource that is in the first downlink control channel region and that is not available for the downlink data transmission from the initial resource occupied by the downlink data.

Figure 3:
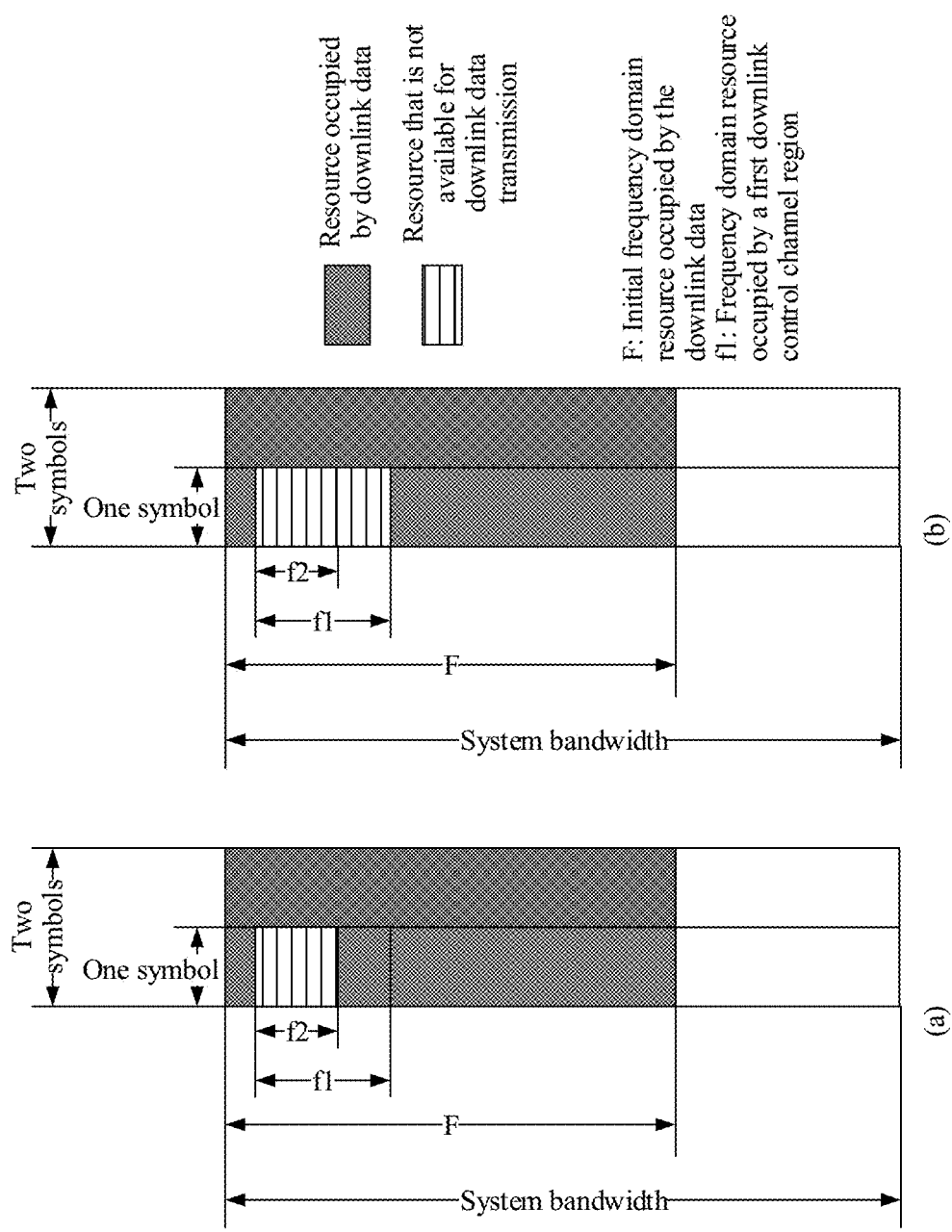
FIG. 3 is a schematic diagram of a first type of downlink control channel region according to an embodiment of the present invention.

For example, as shown in FIG. 3(*a*), the terminal device determines that a TTI length of the downlink data is two symbols, and determines, based on the frequency domain resource information for the downlink data, that an initial frequency domain resource occupied by the downlink data is F. Therefore, the initial resource occupied by the downlink data is located on two symbols in time domain and located on F in frequency domain. The terminal device determines, based on the resource indication information of the first downlink control channel region, that the resource that is in the first downlink control channel region and that is not available for the downlink data transmission is located on a first symbol in time domain and located on f2 in frequency domain. Further, the terminal device determines that the resource actually occupied by the downlink data is a gray part shown in FIG. 3(*a*). It should be noted that, FIG. 3 shows only a case in which N is equal to 1. If N is greater than 1, a region of frequency domain F may further include another downlink control channel region of the N downlink control channel regions.

If the first indication information indicates that the downlink scheduling information does not include the resource indication information of the first downlink control channel region, or the sixth indication information indicates that the quantity of bits of the resource indication information of the first downlink control channel region that is included in the downlink scheduling information is 0, the downlink scheduling information includes frequency domain resource information for the downlink data. The determining, by the terminal device based on the downlink scheduling information, the resource occupied by the downlink data in step 206 is specifically: determining, by the terminal device, that the resource occupied by the downlink data does not include a resource corresponding to the first downlink control channel region, and includes the following steps:

determining, by the terminal device based on the frequency domain resource information for the downlink data, an initial resource occupied by the downlink data; and determining, by the terminal device, that the resource occupied by the downlink data (namely, an actually occupied resource) is a remaining resource obtained by subtracting the resource occupied by the first downlink control channel region from the initial resource occupied by the downlink data.

For example, as shown in FIG. 3(*b*), the terminal device determines, based on the frequency domain resource information for the downlink data, that the initial resource occupied by the downlink data is located on two symbols in time domain and located on F in frequency domain.

Further, the terminal device determines that the first downlink control channel region cannot be used for the downlink data transmission; in other words, the resource that is in the first downlink control channel region and that is occupied by the downlink control channel is located only on f2 in frequency domain. Therefore, the terminal device determines that the resource actually occupied by the downlink data is a gray part shown in FIG. 3(*b*).

The network device may flexibly indicate, by using the first indication information and/or the sixth indication information, whether the downlink scheduling information includes the resource indication information of the first downlink control channel region, to properly adjust downlink control channel overheads and the overheads of the downlink scheduling information based on a current situation. For example, if downlink load is light, or in other words, the downlink control channel overheads do not need to be considered, the network device may configure the downlink scheduling information to not including the resource indication information of the first downlink control channel region, thereby reducing DCI overheads, and improving DCI demodulation performance. If downlink load is heavy, the network device may configure the downlink scheduling information to include the resource indication information of the first downlink control channel region, so that the resource that is not used by the downlink control channel is used to transmit the downlink data, thereby reducing a waste of resources of the downlink control channel, and improving spectral efficiency of the downlink data.

In an optional embodiment, the configuration information of the first downlink control channel region includes the second indication information, and the second indication information indicates the quantity (denoted as M1) of search spaces in the first downlink control channel region. The quantity of search spaces in the first downlink control channel region is 0 or a positive integer. How the second indication information indicates the quantity of search spaces is not limited in this embodiment of the present invention. For example, the second indication information may directly indicate the quantity of search spaces. For example, the second indication information may alternatively indirectly indicate the quantity of search spaces by configuring a quantity of downlink control channel candidates in a search space. When a quantity of downlink control channel candidates in a search space is configured to 0, it indicates that the search space does not exist. Optionally, the second indication information is carried in higher layer signaling, or carried on a PDCCH defined in LTE Rel-8.

The terminal device determines, based on the second indication information, the quantity of search spaces in the first downlink control channel region. If the second indication information indicates that the quantity of search spaces in the first downlink control channel region is a positive integer greater than or equal to 1, the terminal device needs to detect a downlink control channel in one or more search spaces in the first downlink control channel region. If the second indication information indicates that the quantity of search spaces in the first downlink control channel region is equal to 0, no search space exists in the first downlink control channel region; in other words, the network device does not send a downlink control channel to the terminal device in the region. Therefore, the terminal device does not need to detect a downlink control channel in the first downlink control channel region.

If a frequency domain resource occupied by the N downlink control channel regions is semi-statically configured by the network device by using higher layer signaling, the frequency domain resource occupied by the downlink data is dynamically configured by the network device by using the downlink scheduling information. The frequency domain resource occupied by the downlink data should not be excessively limited, but allocated in a relatively large band range. Therefore, a design that M1 is equal to 0 is introduced in this embodiment of the present invention. It is assumed that the network device configures only one downlink control channel region (denoted as an $i^{th}$ downlink control channel region) for a first terminal device, and also configures only one downlink control channel region (denoted as a $j^{th}$ downlink control channel region) for a second terminal device. As described above, the first terminal device does not learn that the $j^{th}$ downlink control channel region exists. Therefore, the network device does not configure, for downlink data sent to the first terminal device, a resource occupied by the $j^{th}$ downlink control channel region. Consequently, a frequency domain resource occupied by the downlink data of the first terminal device is limited. However, in this embodiment of the present invention, the network device may configure the $i^{th}$ downlink control channel region and the $j^{th}$ downlink control channel region (without loss of generality, for the first terminal device, the $j^{th}$ downlink control channel region is considered as the first downlink control channel region) for the first terminal device, and configure that no search space exists in the $j^{th}$ downlink control channel region (in other words, M1 is equal to 0). In this way, a frequency domain resource that can be allocated to the downlink data of the first terminal device is not limited. In addition, the first terminal device does not need to perform blind detection for a downlink control channel in the $j^{th}$ downlink control channel region; in other words, no additional blind detection for a downlink control channel is introduced. For another example, it is assumed that a downlink TTI length of two or three symbols is configured for the first terminal device. However, the first downlink control channel region is configured for use by a terminal device whose downlink TTI length is seven symbols. Therefore, the network device configures M1 to be equal to 0; in other words, the first terminal device does not need to search the region for a downlink control channel, but still needs to learn a downlink control channel occupation status in the region, to release a resource for use by a downlink data.

In an optional embodiment, the configuration information of the first downlink control channel region includes the third indication information, and the third indication information indicates the quantity (denoted as S1) of symbols occupied by the first downlink control channel region in time domain. The quantity of symbols occupied by the first downlink control channel region in time domain is a positive integer less than or equal to 7. For example, a value range of S1 is 1, 2, and 3. For example, a value range of S1 is at least two of 1, 2, and 3. The terminal device determines, based on the third indication information, that the first downlink control channel region occupies S1 symbols in time domain.

In an optional embodiment, the configuration information of the first downlink control channel region includes the fourth indication information, and the fourth indication information indicates the time length of data transmission corresponding to the first downlink control channel region. The time length of data transmission corresponding to the first downlink control channel region may be one or more symbols (denoted as D1 symbols). For example, D1 is a positive integer less than or equal to 7. Because a system may include data transmission having a plurality of TTI lengths, the network device may adaptively configure the time length of data transmission corresponding to the current first downlink control channel region. The terminal device determines, based on the fourth indication information, the time length of data transmission corresponding to the first downlink control channel region.

It should be noted that, the fourth indication information may indicate one or more time lengths of data transmission corresponding to the first downlink control channel region. For example, the fourth indication information indicates that time lengths of data transmission corresponding to the first downlink control channel region are two symbols and three symbols. For example, the fourth indication information indicates that time lengths of data transmission corresponding to the first downlink control channel region are two symbols, three symbols, and one slot.

If the fourth indication information indicates that the time length of data transmission corresponding to the first downlink control channel region is two symbols and/or three symbols, the value range of the quantity of symbols occupied by the first downlink control channel region in time domain is 1 and 2. If the fourth indication information indicates that the time length of data transmission corresponding to the first downlink control channel region is one slot or seven symbols, the value range of the quantity of symbols occupied by the first downlink control channel region in time domain is at least two of 1, 2, and 3. If the fourth indication information indicates that the time lengths of data transmission corresponding to the first downlink control channel region are two symbols, three symbols, and one slot, the value range of the quantity of symbols occupied by the first downlink control channel region in time domain is at least two of 1, 2, and 3.

In an optional embodiment, the configuration information of the first downlink control channel region includes the fifth indication information, and the fifth indication information indicates the mapping manner for the downlink control channel in the first downlink control channel region; wherein the mapping manner for the downlink control channel in the first downlink control channel region includes the centralized mapping manner or the distributed mapping manner. The terminal device determines, based on the fifth indication information, the mapping manner for the downlink control channel in the first downlink control channel region. If the fifth indication information indicates that the downlink control channel in the first downlink control channel region is subject to centralized mapping, the terminal device determines that the downlink control channel in the first downlink control channel region is subject to continuous mapping in frequency domain, or in other words, occupies contiguous physical resource blocks (PRB) in frequency domain. If the fifth indication information indicates that the downlink control channel in the first downlink control channel region is subject to distributed mapping, the terminal device determines that the downlink control channel in the first downlink control channel region is subject to distributed mapping in frequency domain, or in other words, occupies noncontiguous PRBs in frequency domain. To obtain a frequency scheduling gain, the network device configures the centralized mapping; or to obtain a frequency diversity gain, the network device configures the distributed mapping.

If the fifth indication information indicates that the mapping manner for the downlink control channel in the first downlink control channel region is the centralized mapping manner, the quantity of symbols occupied by the first downlink control channel region in time domain is S1-L. If the fifth indication information indicates that the mapping manner for the downlink control channel in the first downlink control channel region is the distributed mapping manner, the quantity of symbols occupied by the first downlink control channel region in time domain is S1-D. A value of S1-L is greater than or equal to that of S1-D. For example, S1-L is equal to 2 or 3, and S1-D is equal to 1. For example, S1-L is equal to 3, and S1-D is equal to 2. Optionally, in this case, the time length of data transmission corresponding to the first downlink control channel region is two symbols or three symbols.

The fifth indication information indicates that the mapping manner for the downlink control channel in the first downlink control channel region is the centralized mapping manner, and the value range of the quantity of symbols occupied by the first downlink control channel region in time domain is at least two of 1, 2, and 3. Alternatively, the fifth indication information indicates that the mapping manner for the downlink control channel in the first downlink control channel region is the distributed mapping manner, and the quantity of symbols occupied by the first downlink control channel region in time domain is 1, or the value range of the quantity of symbols occupied by the first downlink control channel region in time domain is 1 and 2. It should be noted that, when the centralized mapping manner is used, a time domain resource may occupy a plurality of symbols (for example, two or three symbols), so that frequency domain resources can be as centralized as possible, and configured on a PRB with an optimal channel condition. When the distributed mapping manner is used, a quantity of symbols occupied by a time domain resource is as small as possible, so that a frequency domain resource can be as broadened as possible, to obtain a better frequency diversity effect.

In an optional embodiment, the configuration information of the first downlink control channel region includes seventh indication information, and the seventh indication information indicates a scheduling information type of downlink control information transmitted in a search space in the first downlink control channel region. The scheduling information type may be uplink scheduling information, or may be downlink scheduling information.

The seventh indication information indicates a scheduling information type of downlink control information transmitted in each of the M1 search spaces. For example, M1=2, in one of the two search spaces, only uplink scheduling information is included, and in the other search space only downlink scheduling information is included. For example, M1=2, in one of the two search spaces, only uplink scheduling information is included, and in the other search space downlink scheduling information and uplink scheduling information are included. Optionally, that only downlink scheduling information is included in a search space means only downlink scheduling information for the terminal device is included, so that the terminal device may learn, through blind detection and without an additional signaling notification, a downlink control channel resource occupied in the search space.

In an optional embodiment, the configuration information of the first downlink control channel region includes eighth indication information, and the eighth indication information indicates a scheduling information type of downlink control information transmitted in the first downlink control channel region. The scheduling information type may be uplink scheduling information, or may be downlink scheduling information. Optionally, the eighth indication information indicates that only downlink scheduling information for the terminal device is transmitted in the first downlink control channel region, so that the terminal device may learn, through blind detection, a downlink control channel resource occupied in the first downlink control channel region, without an additional signaling notification.

In an optional embodiment, the configuration information of the first downlink control channel region includes ninth indication information, and the ninth indication information indicates a frequency domain resource occupied by the first downlink control channel region. Optionally, the ninth indication information indicates that the first downlink control channel region occupies contiguous frequency domain resources, and the value range of the quantity of symbols occupied by the first downlink control channel region in time domain is at least two of 1, 2, and 3. Optionally, the ninth indication information indicates that the first downlink control channel region occupies noncontiguous frequency domain resources, and the quantity of symbols occupied by the first downlink control channel region in time domain is 1, or the value range of the quantity of symbols occupied by the first downlink control channel region in time domain is 1 and 2.

In an optional embodiment, N>1, the N downlink control channel regions further include a second downlink control channel region, and the configuration information of the N downlink control channel regions includes configuration information of the second downlink control channel region. In this case, the N downlink control channel regions include at least the first downlink control channel region and a second downlink channel control region. For example, N=2. Then the network device determines the configuration information of the first downlink control channel region and the configuration information of the second downlink channel control region, and sends the configuration information of the first downlink control channel region and the configuration information of the second downlink channel control region to the terminal device. The terminal device receives the configuration information of the first downlink control channel region and the configuration information of the second downlink channel control region, and determines the first downlink control channel region and the second downlink channel control region based on the configuration information of the first downlink control channel region and the configuration information of the second downlink channel control region.

It should be noted that, to facilitate understanding of some of the embodiments of the present invention, descriptions of the second downlink control channel region and the configuration information of the second downlink control channel region are introduced. The second downlink control channel region has the same characteristics as the first downlink control channel region. In other words, when the "first downlink control channel region" in any one of the foregoing embodiments is replaced with the "second downlink control channel region", and correspondingly, the "configuration information of the first downlink control channel region" is replaced with the "configuration information of the second downlink control channel region", the described any embodiment is still true.

Therefore, without loss of generality, when the N downlink control channel regions include the first downlink control channel region and the second downlink control channel region, the first downlink control channel region may be any one of the N downlink control channel regions other than the second downlink control channel region, and the second downlink control channel region may be any one of the N downlink control channel regions other than the first downlink control channel region.

To facilitate understanding of some of the embodiments of the present invention, the following description is introduced for indication information included in the configuration information of the second downlink control channel region. It should be noted that, numbers of the indication information are used only to represent the indication information, and not to limit functions and effects of the indication information.

The configuration information of the second downlink control channel region includes at least one of eleventh indication information, twelfth indication information, thirteenth indication information, fourteenth indication information, and fifteenth indication information.

The eleventh indication information indicates whether the downlink scheduling information includes resource indication information of the second downlink control channel region.

The twelfth indication information indicates a quantity of search spaces in the second downlink control channel region, wherein the quantity of search spaces in the second downlink control channel region is 0 or a positive integer.

The thirteenth indication information indicates a quantity of symbols occupied by the second downlink control channel region in time domain, wherein the quantity of symbols occupied by the second downlink control channel region in time domain is a positive integer less than or equal to 7.

The fourteenth indication information indicates a time length of data transmission corresponding to the second downlink control channel region.

The fifteenth indication information indicates a mapping manner for a downlink control channel in the second downlink control channel region, wherein the mapping manner for the downlink control channel in the second downlink control channel region includes the centralized mapping manner or the distributed mapping manner.

In an optional embodiment, the first indication information and the eleventh indication information are separately configured. Therefore, four cases may occur:

Case 1: The downlink scheduling information includes the resource indication information of the first downlink control channel region and the resource indication information of the second downlink control channel region.

Case 2: The downlink scheduling information includes neither the resource indication information of the first downlink control channel region nor the resource indication information of the second downlink control channel region.

Figure 4:
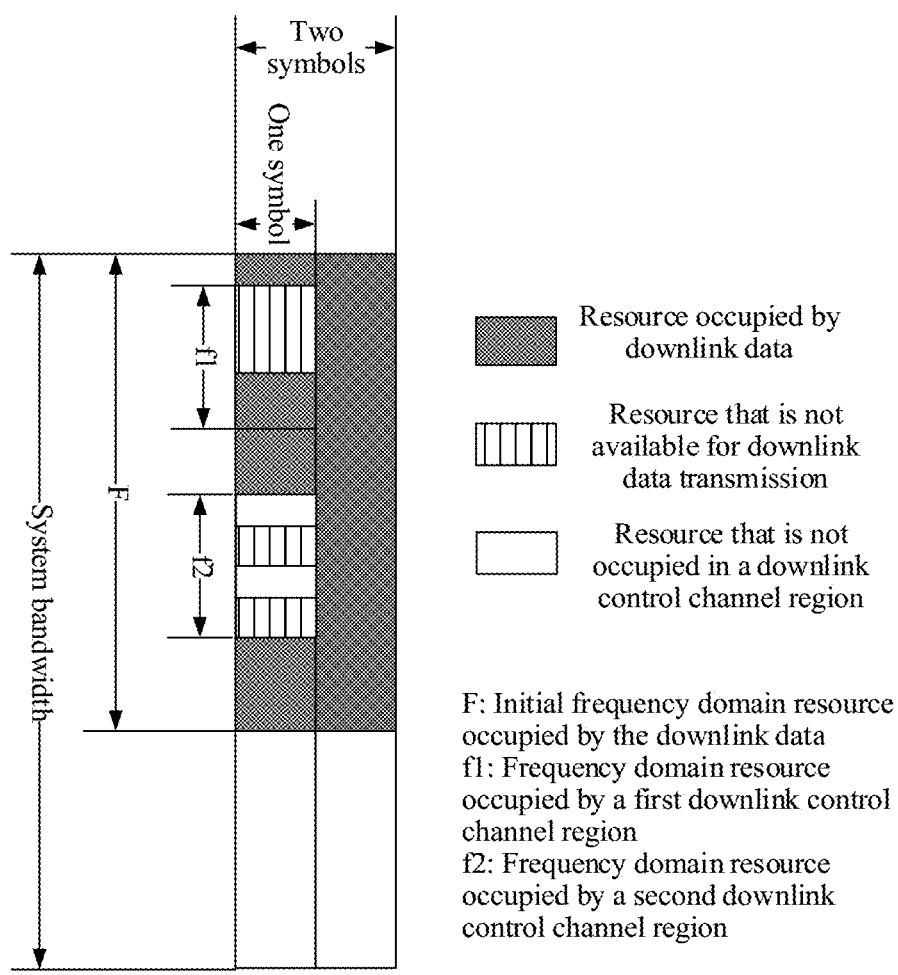
FIG. 4 is a schematic diagram of a second type of downlink control channel region according to an embodiment of the present invention.

Case 3: The downlink scheduling information includes the resource indication information of the first downlink control channel region, but does not include the resource indication information of the second downlink control channel region. As shown in FIG. 4, an idle resource in the first downlink control channel region may be released for downlink data, but an idle resource in the second downlink control channel region cannot be released for downlink data.

Case 4: The downlink scheduling information does not include the resource indication information of the first downlink control channel region, but includes the resource indication information of the second downlink control channel region.

In an optional embodiment, the third indication information and the thirteenth indication information are separately configured. Therefore, two cases may occur:

Case 1: The quantity of symbols occupied by the second downlink control channel region in time domain is the same as the quantity of symbols occupied by the first downlink control channel region in time domain.

Figure 5:
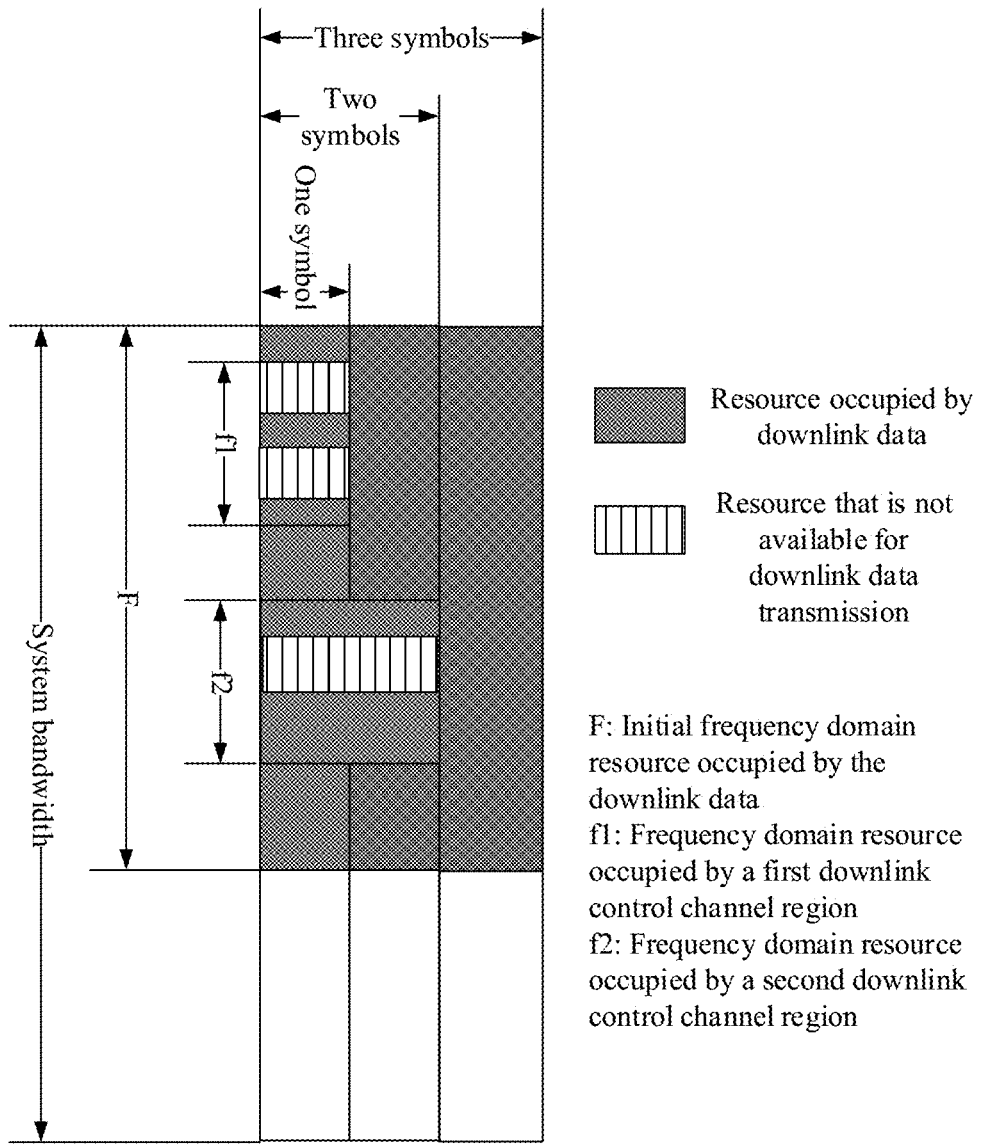
FIG. 5 is a schematic diagram of a third type of downlink control channel region according to an embodiment of the present invention.

Case 2: The quantity of symbols occupied by the second downlink control channel region in time domain is different from the quantity of symbols occupied by the first downlink control channel region in time domain. In this case, to simultaneously achieve different advantages, the network device may configure different quantities of symbols in different downlink control channel regions. For example, the network device may simultaneously configure the centralized mapping manner and the distributed mapping manner, to configure different quantities of symbols. For example, the network device may configure different control channel regions to correspond to different time lengths of data transmission, to configure different quantities of symbols. For example, as shown in FIG. 5, the first downlink control channel region occupies one symbol, and the second downlink control channel region occupies two symbols.

In an optional embodiment, the fourth indication information and the fourteenth indication information are separately configured. Therefore, two cases may occur:

Case 1: The time length of data transmission corresponding to the second downlink control channel region is the same as the time length of data transmission corresponding to the first downlink control channel region.

Case 2: The time length of data transmission corresponding to the second downlink control channel region is different from the time length of data transmission corresponding to the first downlink control channel region. For example, the time length of data transmission corresponding to the first downlink control channel region is two or three symbols, and the time length of data transmission corresponding to the second downlink control channel region is one slot or seven symbols.

In an optional embodiment, the fourth indication information indicates that the time length of data transmission corresponding to the first downlink control channel region is two or three symbols, the second indication information indicates that the quantity of search spaces in the first downlink control channel region is greater than 0, the fourteenth indication information indicates that the time length of data transmission corresponding to the second downlink control channel region is one slot, and the twelfth indication information indicates that the quantity of search spaces in the second downlink control channel region is 0. In this way, the terminal device does not need to search the second downlink control channel region for a downlink control channel, but still needs to learn a downlink control channel occupation status in the region, to release a resource for use by the downlink data.

In an optional embodiment, the fifth indication information and the fifteenth indication information are separately configured. Therefore, two cases may occur: The mapping manner for the downlink control channel in the second downlink control channel region is the same as or different from the mapping manner for the downlink control channel in the first downlink control channel region.

In an optional embodiment, the configuration information of the second downlink control channel region further includes eighteenth indication information, and the eighteenth indication information indicates a scheduling information type of downlink control information transmitted in the second downlink control channel region. Optionally, the eighth indication information and the eighteenth indication information are separately configured. For example, in the first downlink control channel region, only uplink scheduling information is included, and in the second downlink control channel region, only downlink scheduling information is included. For example, in the first downlink control channel region, only uplink scheduling information is included, and in the second downlink control channel region, downlink scheduling information and uplink scheduling information are included. Optionally, only downlink scheduling information is included means only downlink scheduling information for the terminal device is included, so that the terminal device may learn, through blind detection, a downlink control channel resource occupied in the downlink control channel region, without an additional signaling notification.

In an optional embodiment, the configuration information of the first downlink control channel region includes tenth indication information, and the tenth indication information indicates whether the downlink control channel in the first downlink control channel region is demodulated based on a cell-specific reference signal (CRS) or based on a demodulation reference signal (DMRS).

In an optional embodiment, the configuration information of the second downlink control channel region further includes twentieth indication information, and the twentieth indication information indicates whether the downlink control channel in the second downlink control channel region is demodulated based on the CRS or based on the DMRS.

In an optional embodiment, the tenth indication information indicates that the downlink control channel in the first downlink control channel region is demodulated based on the CRS, and the twentieth indication information indicates the downlink control channel in the second downlink control channel region is demodulated based on the DMRS. In this way, the network device may dynamically configure the downlink control channel based on the CRS and the downlink control channel based on the DMRS, to flexibly configure downlink data transmission based on the CRS and downlink data transmission based on the DMRS.

In an optional embodiment, the downlink scheduling information includes first downlink control channel region occupation information and the frequency domain resource information for the downlink data; or the configuration information of the first downlink control channel region includes twenty-first indication information, the twenty-first indication information indicates first downlink control channel region occupation information, and the twenty-first indication information is carried in higher layer signaling. The first downlink control channel region occupation information is 1-bit information, and the first downlink control channel region occupation information is subject to definition 1, definition 2, or definition 3.

Definition 1: The first downlink control channel region occupation information indicates whether the resource occupied by the downlink data includes the resource of the first downlink control channel region. For example, when the 1-bit information is A, it indicates that the resource occupied by the downlink data includes the resource of the first downlink control channel region; or when the 1-bit information is B, it indicates that the resource occupied by the downlink data does not include the resource of the first downlink control channel region.

Definition 2: The first downlink control channel region occupation information indicates whether the first downlink control channel region is available for the downlink data transmission. For example, when the 1-bit information is A, it indicates that the first downlink control channel region is available for the downlink data transmission; or when the 1-bit information is B, it indicates that the first downlink control channel region cannot be used for the downlink data transmission.

Definition 3: The first downlink control channel region occupation information indicates whether the first downlink control channel region is used only for downlink control channel transmission. For example, when the 1-bit information is A, it indicates that the first downlink control channel region can be further used for the downlink data transmission; or when the 1-bit information is B, it indicates that the first downlink control channel region is used only for the downlink control channel transmission.

A is binary '1', and B is binary '0'; or B is binary '1', and A is binary '0'.

In the method, the resource that is not occupied by the control channel can be indicated by using only one bit, so that signaling overheads are greatly reduced.

The determining, by the terminal device based on the downlink scheduling information, the resource occupied by the downlink data in step 206 is specifically: determining, by the terminal device based on the frequency domain resource information for the downlink data and the first downlink control channel region occupation information, the resource occupied by the downlink data.

If the 1-bit information is A, the following steps are specifically included:

determining, by the terminal device based on the frequency domain resource information for the downlink data, an initial resource occupied by the downlink data; and determining, by the terminal device, that the resource occupied by the downlink data (namely, an actually occupied resource) is a remaining resource obtained by subtracting the resource that is in the first downlink control channel region and that is not available for the downlink data transmission from the initial resource occupied by the downlink data.

The resource that is in the first downlink control channel region and that is not available for the downlink data transmission is a resource occupied by a downlink control channel detected by the terminal device in an overlapping region between the initial resource occupied by the downlink data and the first downlink control channel region. It should be noted that, when the terminal device detects no downlink control channel in the region in which the initial resource occupied by the downlink data overlaps the first downlink control channel region, a quantity of resources that are in the first downlink control channel region and that is not available for the downlink data transmission is 0, and the terminal device determines that the resource occupied by the downlink data (namely, the actually occupied resource) is the initial resource occupied by the downlink data. When the terminal device detects one or more downlink control channels in the region in which the initial resource occupied by the downlink data overlaps the first downlink control channel region, the resource that is in the first downlink control channel region and that is not available for the downlink data transmission is a resource occupied by the one or more downlink control channels, and the terminal device determines that the resource occupied by the downlink data (namely, the actually occupied resource) is a remaining resource obtained by subtracting the resource occupied by the one or more downlink control channels from the initial resource occupied by the downlink data.

Alternatively, the resource that is in the first downlink control channel region and that is not available for the downlink data transmission is a resource occupied by a downlink control channel detected by the terminal device in an overlapping region between the initial resource occupied by the downlink data and the first downlink control channel region, as well as a CCE/RB before a CCE/RB occupied by the detected downlink control channel. As described above, when the terminal device detects no downlink control channel in the overlapping region between the initial resource occupied by the downlink data and the first downlink control channel region, the terminal device determines that the resource occupied by the downlink data (namely, the actually occupied resource) is the initial resource occupied by the downlink data. When the terminal device detects one or more downlink control channels in the overlapping region between the initial resource occupied by the downlink data and the first downlink control channel region, the resource that is in the first downlink control channel region and that is not available for the downlink data transmission is a resource occupied by the one or more downlink control channels and a resource on which a CCE/RB before a CCE/RB occupied by the one or more downlink control channels is located.

Figure 6:
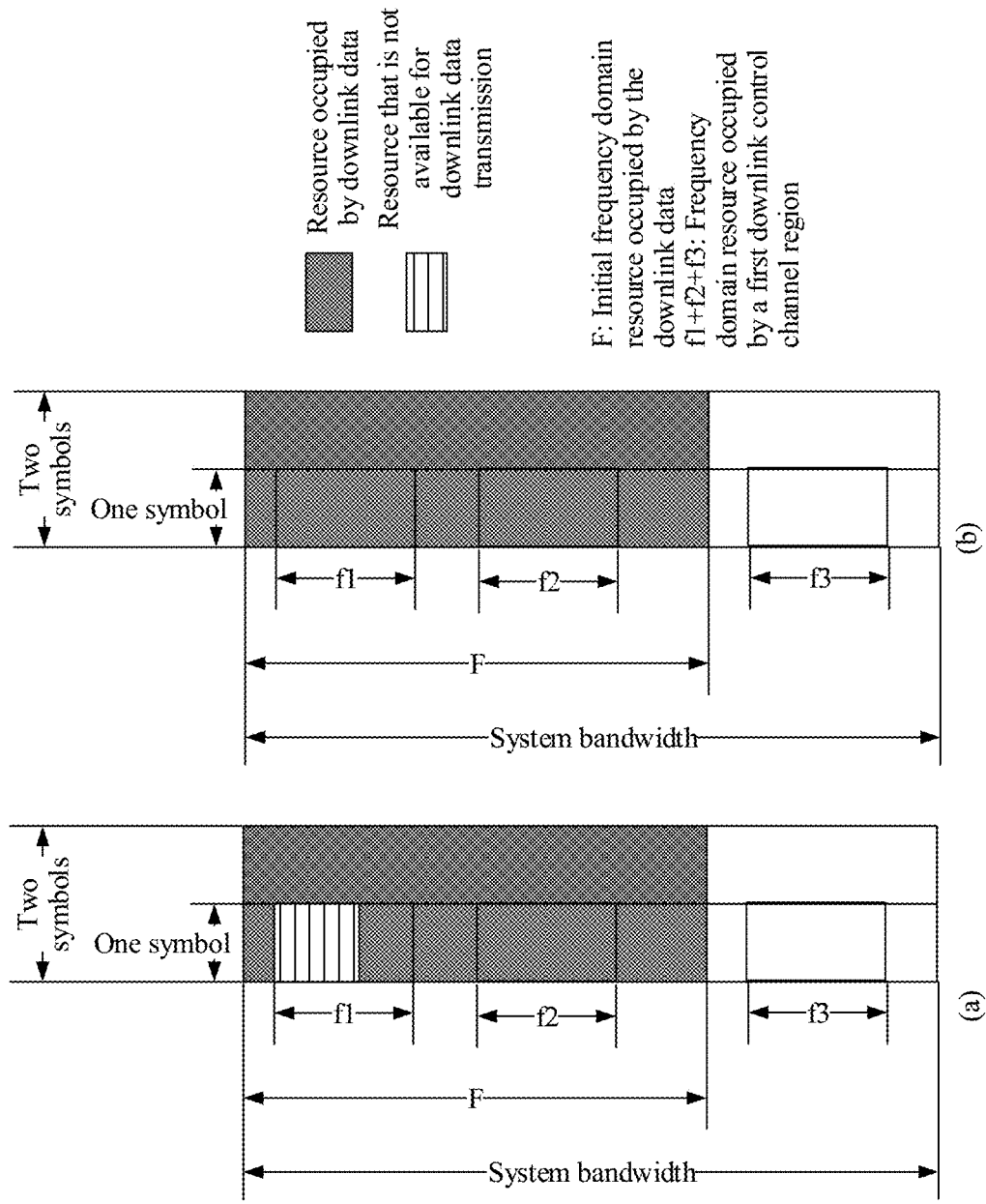
FIG. 6 is a schematic diagram of a fourth type of downlink control channel region according to an embodiment of the present invention.

For example, as shown in FIG. 6, the terminal device determines that a TTI length of the downlink data is two symbols, and determines, based on the frequency domain resource information for the downlink data, that an initial frequency domain resource occupied by the downlink data is F. Therefore, the initial resource occupied by the downlink data is located on two symbols in time domain and located on F in frequency domain. The terminal device determines that the first downlink control channel region is located on a first symbol in time domain and located on f1, f2, and f3 in frequency domain. The region in which the initial resource occupied by the downlink data overlaps the first downlink control channel region is located on the first symbol in time domain and located on f1 and f2 in frequency domain. As shown in FIG. 6(a), the terminal device detects a downlink control channel in frequency domain f1, and therefore the terminal device determines that the resource actually occupied by the downlink data is a gray part shown in FIG. 6(a). As shown in FIG. 6(b), the terminal device detects no downlink control channel in frequency domain f1, and therefore the terminal device determines that the resource actually occupied by the downlink data is a gray part shown in FIG. 6(b).

During scheduling, the network device allocates a suitable initial resource for the downlink data based on a channel condition. An unallocated resource is basically not suitable for the downlink data transmission of the terminal device. Therefore, even if there is an available control channel resource in a region in which the first downlink control channel region does not overlap the initial resource, the control channel resource is not used for the downlink data transmission of the terminal device. Therefore, in this method, whether there is a resource that is not available for the downlink data transmission is determined only on the initial resource.

If the 1-bit information is B, the following steps are specifically included:

determining, by the terminal device based on the frequency domain resource information for the downlink data, an initial resource occupied by the downlink data; and determining, by the terminal device, that the resource occupied by the downlink data (namely, an actually occupied resource) is a remaining resource obtained by subtracting the resource occupied by the first downlink control channel region from the initial resource occupied by the downlink data.

In an optional embodiment, the downlink scheduling information includes the first downlink control channel region occupation information, second downlink control channel region occupation information, and the frequency domain resource information for the downlink data; or the configuration information of the second downlink control channel region further includes twenty-second indication information, where the twenty-second indication information indicates second downlink control channel region occupation information, and the twenty-second indication information is carried in higher layer signaling.

Optionally, the second downlink control channel region occupation information is 1-bit information. For definitions of the second downlink control channel region occupation information, reference may be made to the foregoing descriptions of the three definitions of the first downlink control channel region occupation information, while only "first" needs to be replaced with "second", "A" needs to be replaced with "C", and "B" needs to be replaced with "D". Details are not described herein again. The first downlink control channel region occupation information and the second downlink control channel region occupation information are separately indicated.

In the method, resources that are in the two control channel regions and that are not occupied by control channels can be indicated by using only two bits, so that signaling overheads are greatly reduced.

The determining, by the terminal device based on the downlink scheduling information, the resource occupied by the downlink data in step 206 is specifically: determining, by the terminal device based on the frequency domain resource information for the downlink data, the first downlink control channel region occupation information, and the second downlink control channel region occupation information, the resource occupied by the downlink data.

If the first downlink control channel region occupation information is A and the second downlink control channel region occupation information is C, the following steps are specifically included:

determining, by the terminal device based on the frequency domain resource information for the downlink data, an initial resource occupied by the downlink data; and determining, by the terminal device, that the resource occupied by the downlink data (namely, an actually occupied resource) is a remaining resource obtained by subtracting resources that are not available for the downlink data transmission in the first downlink control channel region and that are not available for the downlink data transmission in the second downlink control channel region from the initial resource occupied by the downlink data.

For a resource that is in the second downlink control channel region and that is not available for the downlink data transmission, refer to the description of the resource that is in the first downlink control channel region and that is not available for the downlink data transmission. Details are not described herein again.

If the first downlink control channel region occupation information is B and the second downlink control channel region occupation information is D, the following steps are specifically included:

determining, by the terminal device based on the frequency domain resource information for the downlink data, an initial resource occupied by the downlink data; and determining, by the terminal device, that the resource occupied by the downlink data (namely, an actually occupied resource) is a remaining resource obtained by subtracting resources occupied by the first downlink control channel region and the second downlink control channel region from the initial resource occupied by the downlink data.

If the first downlink control channel region occupation information is A and the second downlink control channel region occupation information is D, the following steps are specifically included:

determining, by the terminal device based on the frequency domain resource information for the downlink data, an initial resource occupied by the downlink data; and determining, by the terminal device, that the resource occupied by the downlink data (namely, an actually occupied resource) is a remaining resource obtained by subtracting the resource that is in the first downlink control channel region and that is not available for the downlink data transmission and a resource occupied by the second downlink control channel region from the initial resource occupied by the downlink data.

Optionally, the first downlink control channel region occupation information and the second downlink control channel region occupation information are jointly indicated by using m bits, and m is a positive integer, for example, 1 or 2.

For example, the first downlink control channel region occupation information and the second downlink control channel region occupation information are 1 bit in total, and are subject to definition 1, definition 2, or definition 3.

Definition 1: The first downlink control channel region occupation information and the second downlink control channel region occupation information are used to indicate whether the resource occupied by the downlink data includes the resource of the first downlink control channel region and the resource of the second downlink control channel region. For example, when the 1-bit information is E, it indicates that the resource occupied by the downlink data includes the resource of the first downlink control channel region and the resource of the second downlink control channel region. When the 1-bit information is F, it indicates that the resource occupied by the downlink data includes neither the resource of the first downlink control channel region nor the resource of the second downlink control channel region.

Definition 2: The first downlink control channel region occupation information and the second downlink control channel region occupation information are used to indicate whether the first downlink control channel region and the second downlink control channel region can be used for the downlink data transmission. For example, when the 1-bit information is E, it indicates that the first downlink control channel region and the second downlink control channel region can be used for the downlink data transmission; or when the 1-bit information is F, it indicates that the first downlink control channel region and the second downlink control channel region is not available for the downlink data transmission.

Definition 3: The first downlink control channel region occupation information and the second downlink control channel region occupation information are used to indicate whether the first downlink control channel region and the second downlink control channel region are used only for downlink control channel transmission. For example, when the 1-bit information is E, it indicates that the first downlink control channel region and the second downlink control channel region can be further used for the downlink data transmission; or when the 1-bit information is F, it indicates that the first downlink control channel region and the second downlink control channel region are used only for the downlink control channel transmission.

E is binary '1', and F is binary '0'; or F is binary '1', and E is binary '0'.

In the method, resources that are in the two control channel regions and that are not occupied by control channels can be indicated by using only one bit, so that signaling overheads are greatly reduced.

If the second downlink control channel region occupation information is F, step 206 specifically includes the following steps:

determining, by the terminal device based on the frequency domain resource information for the downlink data, an initial resource occupied by the downlink data; and determining, by the terminal device, that the resource occupied by the downlink data (namely, an actually occupied resource) is a remaining resource obtained by subtracting resources occupied by the first downlink control channel region and the second downlink control channel region from the initial resource occupied by the downlink data.

Optionally, if the first downlink control channel region occupation information and the second downlink control channel region occupation information are E, step 206 specifically includes the following steps:

determining, by the terminal device based on the frequency domain resource information for the downlink data, an initial resource occupied by the downlink data; and determining, by the terminal device, that the resource occupied by the downlink data (namely, an actually occupied resource) is a remaining resource obtained by subtracting resources that are not available for the downlink data transmission in the first downlink control channel region and that are not available for the downlink data transmission in the second downlink control channel region from the initial resource occupied by the downlink data.

Optionally, if the first downlink control channel region occupation information and the second downlink control channel region occupation information are E, step 206 specifically includes the following steps:

determining, by the terminal device based on the frequency domain resource information for the downlink data, an initial resource occupied by the downlink data; and determining, by the terminal device, that the resource occupied by the downlink data (namely, an actually occupied resource) is the initial resource occupied by the downlink data plus resources that are in the first downlink control channel region and the second downlink control channel region and that is available for the downlink data transmission.

The resources that are in the first downlink control channel region and the second downlink control channel region and that is available for the downlink data transmission are resources in the first downlink control channel region and the second downlink control channel region other than a resource occupied by a detected downlink control channel. It should be noted that, when the terminal device detects no downlink control channel in the first downlink control channel region and the second downlink control channel region, all resources in the first downlink control channel region and the second downlink control channel region are available. When the terminal device detects one or more downlink control channels in the first downlink control channel region and the second downlink control channel region, resources in the first downlink control channel region and the second downlink control channel region other than a resource occupied by the one or more downlink control channels are available resources.

Alternatively, the resources that are in the first downlink control channel region and the second downlink control channel region and that is available for the downlink data transmission are resources that are in the first downlink control channel region and the second downlink control channel region and that are other than a resource occupied by a detected downlink control channel and a CCE/RB before a CCE/RB occupied by the detected downlink control channel. It should be noted that, when the terminal device detects no downlink control channel in the first downlink control channel region and the second downlink control channel region, all resources in the first downlink control channel region and the second downlink control channel region are available. When the terminal device detects one or more downlink control channels in the first downlink control channel region and the second downlink control channel region, resources that are in the first downlink control channel region and the second downlink control channel region and that are other than a resource occupied by the one or more downlink control channels and a CCE/RB before a CCE/RB occupied by the one or more downlink control channels are available resources. In an optional embodiment, the first downlink control channel region includes N CCEs, and one CCE includes C SREGs. C is a positive integer. For example, C is equal to 6, 8, or 10. A short resource-element group (SREG) occupies $N_{SC}$ contiguous subcarriers in frequency domain and occupies $N_{symb}^{DL}$ symbols in time domain. $N_{SC}$ is a positive integer, and $N_{symb}^{DL}$ is a positive integer not greater than 7. For example, $N_{symb}^{DL}=1$, and $N_{SC}=6$. In other words, one SREG occupies six subcarriers in frequency domain and occupies one symbol in time domain, namely, six REs in total. In this case, C is equal to 6, 8, or 10. For example, $N_{symb}^{DL}=2$, and $N_{SC}=6$. In other words, one SREG occupies six subcarriers in frequency domain and occupies two symbols in time domain, namely, 12 REs in total. In this case, C is equal to 3, 4, or 5.

Optionally, if $N_{SC}=6$, and a CCE includes C noncontiguous SREGs, the resource that is available for the downlink data transmission in the first downlink control channel region or the resource that is not available for the downlink data transmission in the first downlink control channel region is indicated based on a minimum granularity of one frequency domain RB. That is, a minimum indication granularity is two CCEs. In this way, overheads of the resource indication information of the first downlink control channel region can be reduced, and that six REs cannot be allocated for use by a PDSCH based on a DMRS can be prevented.

To implement the foregoing embodiments, an embodiment of the present invention further provides a terminal device. It should be noted that, the terminal device can perform the method in the foregoing embodiments. Therefore, for specific details of this embodiment, refer to descriptions in the foregoing embodiments. For brevity, the same content is not described below.

Figure 7:
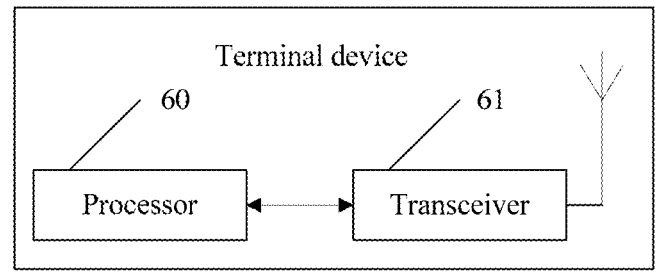
FIG. 7 is a schematic diagram of a first information receiving apparatus according to an embodiment of the present invention.

As shown in FIG. 7, the terminal device may include a processor and a transceiver. Certainly, the terminal device may further include a memory and the like.

The transceiver is configured to receive configuration information of N downlink control channel regions, where the N downlink control channel regions include a first downlink control channel region, the configuration information of the N downlink control channel regions includes configuration information of the first downlink control channel region, and N is a positive integer.

The processor is configured to determine the N downlink control channel regions based on the configuration information of the N downlink control channel regions, where the configuration information of the first downlink control channel region includes at least one of first indication information, second indication information, third indication information, fourth indication information, and fifth indication information.

The first indication information indicates whether downlink scheduling information includes resource indication information of the first downlink control channel region.

The second indication information indicates a quantity of search spaces in the first downlink control channel region, wherein the quantity of search spaces in the first downlink control channel region is 0 or a positive integer.

The third indication information indicates a quantity of symbols occupied by the first downlink control channel region in time domain, wherein the quantity of symbols occupied by the first downlink control channel region in time domain is a positive integer less than or equal to 7.

The fourth indication information indicates a time length of data transmission corresponding to the first downlink control channel region.

The fifth indication information indicates a mapping manner for a downlink control channel in the first downlink control channel region, wherein the mapping manner for the downlink control channel in the first downlink control channel region includes a centralized mapping manner or a distributed mapping manner.

In an optional embodiment, the transceiver is further configured to receive the downlink scheduling information, where the downlink scheduling information is carried on one or more downlink control channels in the N downlink control channel regions; and the processor is further configured to determine, based on the downlink scheduling information, a resource occupied by downlink data.

To implement the foregoing embodiments, an embodiment of the present invention further provides another terminal device. It should be noted that, the terminal device can perform the method in the foregoing embodiments. Therefore, for specific details of this embodiment, refer to descriptions in the foregoing embodiments. For brevity, the same content is not described below.

Figure 8:
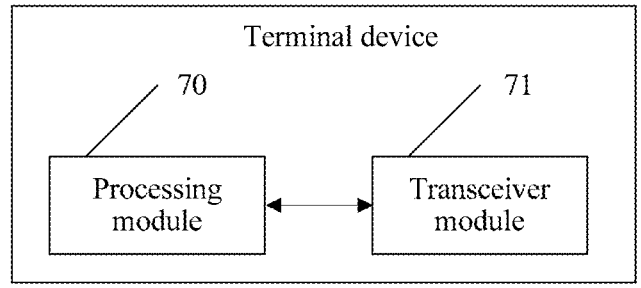
FIG. 8 is a schematic diagram of a second information receiving apparatus according to an embodiment of the present invention.

As shown in FIG. 8, the terminal device may include a processing module and a transceiver module. Certainly, the terminal device may further include a storage module and the like.

The transceiver module is configured to receive configuration information of N downlink control channel regions, where the N downlink control channel regions include a first downlink control channel region, the configuration information of the N downlink control channel regions includes configuration information of the first downlink control channel region, and N is a positive integer.

The processing module is configured to determine the N downlink control channel regions based on the configuration information of the N downlink control channel regions, where the configuration information of the first downlink control channel region includes at least one of first indication information, second indication information, third indication information, fourth indication information, and fifth indication information.

The first indication information indicates whether downlink scheduling information includes resource indication information of the first downlink control channel region.

The second indication information indicates a quantity of search spaces in the first downlink control channel region, wherein the quantity of search spaces in the first downlink control channel region is 0 or a positive integer.

The third indication information indicates a quantity of symbols occupied by the first downlink control channel region in time domain, wherein the quantity of symbols occupied by the first downlink control channel region in time domain is a positive integer less than or equal to 7.

The fourth indication information indicates a time length of data transmission corresponding to the first downlink control channel region.

The fifth indication information indicates a mapping manner for a downlink control channel in the first downlink control channel region, wherein the mapping manner for the downlink control channel in the first downlink control channel region includes a centralized mapping manner or a distributed mapping manner.

In an optional embodiment, the transceiver module is further configured to receive the downlink scheduling information, where the downlink scheduling information is carried on one or more downlink control channels in the N downlink control channel regions; and the processing module is further configured to determine, based on the downlink scheduling information, a resource occupied by downlink data.

It should be noted that, for specific implementations of receiving, by the terminal device, the configuration information of the downlink control channel regions and determining the downlink control channel regions, refer to descriptions in the foregoing method embodiments. This terminal device embodiment is based on the same idea as the foregoing method embodiments, and brings the same technical effects as the foregoing method embodiments in the embodiments of the present invention. For specific content, refer to descriptions in the foregoing method embodiments in the embodiments of the present invention. Details are not described herein again.

To implement the foregoing embodiments, an embodiment of the present invention further provides a network device. It should be noted that, the network device can perform the method in the foregoing embodiments. Therefore, for specific details of this embodiment, refer to descriptions in the foregoing embodiments. For brevity, the same content is not described below.

Figure 9:
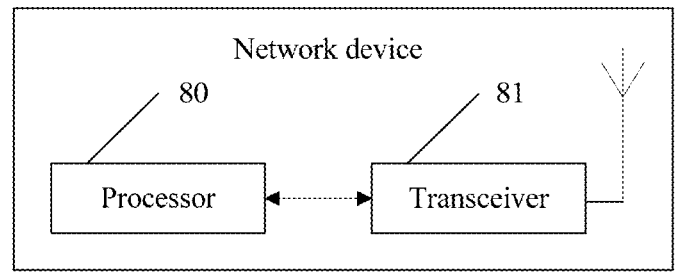
FIG. 9 is a schematic diagram of a first information sending apparatus according to an embodiment of the present invention.

As shown in FIG. 9, the network device may include a processor and a transceiver. Certainly, the network device may further include a memory and the like.

The processor is configured to determine configuration information of N downlink control channel regions, where the N downlink control channel regions include a first downlink control channel region, the configuration information of the N downlink control channel regions includes configuration information of the first downlink control channel region, and N is a positive integer.

The transceiver is configured to send the configuration information of the N downlink control channel regions.

The configuration information of the first downlink control channel region includes at least one of first indication information, second indication information, third indication information, fourth indication information, and fifth indication information.

The first indication information indicates whether downlink scheduling information includes resource indication information of the first downlink control channel region.

The second indication information indicates a quantity of search spaces in the first downlink control channel region, wherein the quantity of search spaces in the first downlink control channel region is 0 or a positive integer.

The third indication information indicates a quantity of symbols occupied by the first downlink control channel region in time domain, wherein the quantity of symbols occupied by the first downlink control channel region in time domain is a positive integer less than or equal to 7.

The fourth indication information indicates a time length of data transmission corresponding to the first downlink control channel region.

The fifth indication information indicates a mapping manner for a downlink control channel in the first downlink control channel region, wherein the mapping manner for the downlink control channel in the first downlink control channel region includes a centralized mapping manner or a distributed mapping manner.

In an optional embodiment, the processor is further configured to determine a resource occupied by downlink data; the transceiver is further configured to send the downlink scheduling information, where the downlink scheduling information is carried on one or more downlink control channels in the N downlink control channel regions, and the downlink scheduling information is used to schedule the downlink data transmission; and the transceiver is further configured to send the downlink data on the resource occupied by the downlink data.

To implement the foregoing embodiments, an embodiment of the present invention further provides another network device. It should be noted that, the network device can perform the method in the foregoing embodiments. Therefore, for specific details of this embodiment, refer to descriptions in the foregoing embodiments. For brevity, the same content is not described below.

Figure 10:
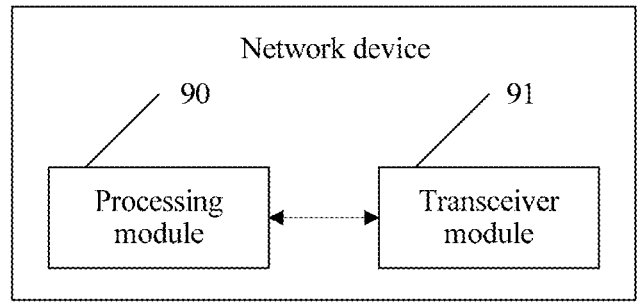
FIG. 10 is a schematic diagram of a second information sending apparatus according to an embodiment of the present invention.

As shown in FIG. 10, the network device may include a processing module and a transceiver module. Certainly, the network device may further include a storage module and the like.

The processing module is configured to determine configuration information of N downlink control channel regions, where the N downlink control channel regions include a first downlink control channel region, the configuration information of the N downlink control channel regions includes configuration information of the first downlink control channel region, and N is a positive integer.

The transceiver module is configured to send the configuration information of the N downlink control channel regions.

The configuration information of the first downlink control channel region includes at least one of first indication information, second indication information, third indication information, fourth indication information, and fifth indication information.

The first indication information indicates whether downlink scheduling information includes resource indication information of the first downlink control channel region.

The second indication information indicates a quantity of search spaces in the first downlink control channel region, wherein the quantity of search spaces in the first downlink control channel region is 0 or a positive integer.

The third indication information indicates a quantity of symbols occupied by the first downlink control channel region in time domain, wherein the quantity of symbols occupied by the first downlink control channel region in time domain is a positive integer less than or equal to 7.

The fourth indication information indicates a time length of data transmission corresponding to the first downlink control channel region.

The fifth indication information indicates a mapping manner for a downlink control channel in the first downlink control channel region, wherein the mapping manner for the downlink control channel in the first downlink control channel region includes a centralized mapping manner or a distributed mapping manner.

In an optional embodiment, the processing module is further configured to determine a resource occupied by downlink data; the transceiver module is further configured to send the downlink scheduling information, where the downlink scheduling information is carried on one or more downlink control channels in the N downlink control channel regions, and the downlink scheduling information is used to schedule the downlink data transmission; and the transceiver module is further configured to send the downlink data on the resource occupied by the downlink data.

It should be noted that, for specific implementations of determining, by the network device, the configuration information of the downlink control channel regions and sending the configuration information of the downlink control channel regions, refer to descriptions in the foregoing method embodiments. This network device embodiment is based on the same idea as the foregoing method embodiments, and brings the same technical effects as the foregoing method embodiments in the embodiments of the present invention. For specific content, refer to descriptions in the foregoing method embodiments in the embodiments of the present invention. Details are not described herein again.

It should be noted that, the processor in all the foregoing embodiments in the embodiments of the present invention may be a central processing unit (CPU), or may be another general purpose processor, a digital signal processor (DSP), an application-specific integrated circuit (ASIC), a field programmable gate array (FPGA) or another programmable logic device, a discrete gate, a transistor logic device, a discrete hardware component, or the like. In addition, the network device and the terminal device in the embodiments of the present invention may further include a component such as a memory. The memory herein may include a read-only memory and a random access memory, and provide an instruction and data for the processor. A part of the memory may further include a non-volatile random access memory. For example, the memory may further store device type information. The processor invokes instruction code in the memory, to control other modules of the network device and the user equipment in the embodiments of the present invention to perform the foregoing operations.

It should be understood that, "one embodiment", "an embodiment", or "an embodiment of the present invention" mentioned throughout the specification means that particular features, structures, or characteristics related to the embodiment are included in at least one of the embodiments of the present invention. Therefore, "in one embodiment", "in an embodiment", or "in an embodiment of the present invention" that appears throughput the specification does not necessarily mean a same embodiment. In addition, the particular features, structure, or characteristics may be combined in one or more embodiments in any proper manner.

It should be understood that, the sequence numbers of the foregoing processes do not mean execution sequences of the embodiments of the present invention, and should not be construed as any limitation on the implementation processes of the embodiments of the present invention. The execution sequences of the processes should be determined based on functions and internal logic of the processes.

In addition, the terms "system" and "network" may be used interchangeably in this specification. It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in the embodiments of this application, "B corresponding to A" indicates that B is associated with A, and B may be determined based on A. However, it should also be understood that, determining B based on A does not mean that B is determined based only on A, and B may also be determined based on A and/or other information.

A person of ordinary skill in the art may be aware that, the units and steps in the examples described with reference to the embodiments disclosed in this specification may be implemented by electronic hardware, computer software, or a combination thereof. To clearly describe interchangeability between the hardware and the software, the foregoing has generally described compositions and steps of each example according to functions. Whether the functions are performed by hardware or software depends on particular applications and design constraint conditions of the technical solutions. A person skilled in the art may use a different method to implement the described functions for each particular application, but it should not be considered that the implementation goes beyond the scope of the embodiments of the present invention.

In the embodiments provided in this application, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located at one position, or may be distributed on a plurality of network units. Some or all of the units may be selected based on actual needs to achieve the objectives of the solutions of the embodiments.

When the integrated unit is implemented in a form of a software function unit and sold or used as an independent product, the integrated unit may be stored in a computer-readable storage medium. Based on such an understanding, the technical solutions in the embodiments of the present invention, or the part contributing to the current system, or some of the technical solutions may be implemented in the form of a software product. The computer software product is stored in a storage medium, and includes several instructions for instructing a computer device (which may be a personal computer, a server, a network device, or the like) to perform all or some of steps of the method described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are only specific implementations of the embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention. Therefore, the protection scope of the embodiments of the present invention shall be subject to the protection scope of the claims.

What is claimed is:

1. A method, comprising:
   receiving, by a terminal device, configuration information of a downlink control channel region via a radio resource control (RRC) signaling, wherein the downlink control channel region includes a first downlink control channel region, wherein the configuration information comprises a first indication information, the first indication information corresponds to a first frequency resource in the first downlink control channel region, and the first indication information indicates that downlink control information (DCI) comprises a second indication information, the second indication information comprises 1-bit information corresponding to the first frequency resource;
   receiving, by the terminal device, the DCI in a downlink control channel, wherein the DCI comprises information of a second frequency resource for downlink data and the second indication information; and
   in response to the 1-bit information being "1", determining, by the terminal device, that a third frequency resource carrying the downlink data comprises the second frequency resource but does not include the first frequency resource;
   receiving, by the terminal device, the downlink data carried on the third frequency resource.

2. The method according to claim 1, wherein the downlink control channel region further includes a second downlink control channel region, the first indication information further corresponds to a fourth frequency resource in the second downlink control channel region, and the second indication information further comprises a second 1-bit information corresponding to the fourth frequency resource;
   wherein the determining, by the terminal device, a third frequency resource carrying the downlink data further comprising:
   in response to the second 1-bit information being "1", determining, by the terminal device, that the third frequency resource carrying the downlink data comprises the second frequency resource but does not include the fourth frequency resource.

3. The method according to claim 1, wherein the downlink control channel region further includes a second downlink control channel region, the first indication information further corresponds to a fourth frequency resource in the second downlink control channel region, and the 1-bit information in the second indication information further corresponds to the fourth frequency resource;
   wherein the determining, by the terminal device, a third frequency resource carrying the downlink data comprising:
   in response to the 1-bit information being "1", determining, by the terminal device, that the third frequency resource carrying the downlink data comprises the second frequency resource but does not include either the first frequency resource or the fourth frequency resource.

4. The method according to claim 1, wherein no search space exists in the downlink control channel region, or at least one search space exists in the downlink control channel region.

5. An apparatus, comprising:
   a transceiver;
   at least one processor; and
   one or more memories coupled to the at least one processor and storing programming instructions for execution by the at least one processor to cause the apparatus to:
   receive, through the transceiver, configuration information of a downlink control channel region via a radio resource control (RRC) signaling, wherein the downlink control channel region includes a first downlink control channel region, wherein the configuration information comprises a first indication information, the first indication information corresponds to a first frequency resource in the first downlink control channel region, and the first indication information indicates that downlink control information (DCI) comprises a second indication information, the second indication information comprises 1-bit information corresponding to the first frequency resource;
   receive, through the transceiver, the DCI in a downlink control channel, wherein the DCI comprises information of a second frequency resource for downlink data and the second indication information;
   in response to the 1-bit information being "1", determine that a third frequency resource carrying the downlink data comprises the second frequency resource but does not include the first frequency resource; and receive, through the transceiver, the downlink data carried on the third frequency resource.

6. The apparatus according to claim 5, wherein the downlink control channel region further includes a second downlink control channel region, the first indication information further corresponds to a fourth frequency resource in the second downlink control channel region, and the second indication information further comprises a second 1-bit information corresponding to the fourth frequency resource;

the one or more memories store programming instructions for execution by the at least one processor to cause the apparatus to: in response to the second 1-bit information being "1", determine that the third frequency resource carrying the downlink data comprises the second frequency resource but does not include the fourth frequency resource.

7. The apparatus according to claim 5, wherein the downlink control channel region further includes a second downlink control channel region, the first indication information further corresponds to a fourth frequency resource in the second downlink control channel region, and the 1-bit information in the second indication information further corresponds to the fourth frequency resource;

the one or more memories store programming instructions for execution by the at least one processor to cause the apparatus to: in response to the 1-bit information being "1", determine that a third frequency resource carrying the downlink data comprises the second frequency resource but does not include either the first frequency resource or the fourth frequency resource.

8. The apparatus according to claim 5, wherein no search space exists in the downlink control channel region, or at least one search space exists in the downlink control channel region.

9. A method, comprising:

transmitting, by a network device, configuration information of a downlink control channel region via a radio resource control (RRC) signaling, wherein the downlink control channel region includes a first downlink control channel region, wherein the configuration information comprises a first indication information, the first indication information corresponds to a first frequency resource in the first downlink control channel region, and the first indication information indicates that downlink control information (DCI) comprises a second indication information, the second indication information comprises 1-bit information corresponding to the first frequency resource;

transmitting, by the network device, the DCI in a downlink control channel, wherein the DCI comprises information of a second frequency resource for downlink data and the second indication information, wherein the 1-bit information of the second indication information is set to "1" to indicate that a third frequency resource carrying the downlink data comprises the second frequency resource but does not include the first frequency resource;

transmitting, by the network device, the downlink data carried on the third frequency resource.

10. The method according to claim 9, wherein the downlink control channel region further includes a second downlink control channel region, the first indication information further corresponds to a fourth frequency resource in the second downlink control channel region, and the second indication information further comprises a second 1-bit information corresponding to the fourth frequency resource;

wherein the second 1-bit information of the second indication information is set to "1" to indicate that the third frequency resource carrying the downlink data comprises the second frequency resource but does not include the fourth frequency resource.

11. The method according to claim 9, wherein the downlink control channel region further includes a second downlink control channel region, the first indication information further corresponds to a fourth frequency resource in the second downlink control channel region, and the 1-bit information in the second indication information further corresponds to the fourth frequency resource;

wherein the 1-bit information of the second indication information is set to "1" to indicate that the third frequency resource carrying the downlink data comprises the second frequency resource but does not include either the first frequency resource or the fourth frequency resource.

12. The method according to claim 9, wherein no search space exists in the downlink control channel region, or at least one search space exists in the downlink control channel region.

13. An apparatus, comprising:

a transceiver;

at least one processor; and one or more memories coupled to the at least one processor and storing programming instructions for execution by the at least one processor to cause the apparatus to:

transmit, through the transceiver, configuration information of a downlink control channel region via a radio resource control (RRC) signaling, wherein the downlink control channel region includes a first downlink control channel region, wherein the configuration information comprises a first indication information, the first indication information corresponds to a first frequency resource in the first downlink control channel region, and the first indication information indicates that downlink control information (DCI) comprises a second indication information, the second indication information comprises 1-bit information corresponding to the first frequency resource;

transmit, through the transceiver, the DCI in a downlink control channel, wherein the DCI comprises information of a second frequency resource for downlink data and the second indication information, wherein the 1-bit information of the second indication information is set to "1" to indicate that a third frequency resource carrying the downlink data comprises the second frequency resource but does not include the first frequency resource; and transmit, through the transceiver, the downlink data carried on the third frequency resource.

14. The apparatus according to claim 13, wherein the downlink control channel region further includes a second downlink control channel region, the first indication information further corresponds to a fourth frequency resource in the second downlink control channel region, and the second indication information further comprises a second 1-bit information corresponding to the fourth frequency resource;

wherein the second 1-bit information of the second indication information is set to "1" to indicate that the third frequency resource carrying the downlink data comprises the second frequency resource but does not include the fourth frequency resource.

15. The apparatus according to claim 13, wherein the downlink control channel region further includes a second downlink control channel region, the first indication information further corresponds to a fourth frequency resource in the second downlink control channel region, and the 1-bit information in the second indication information further corresponds to the fourth frequency resource;

wherein the 1-bit information of the second indication information is set to "1" to indicate that the third frequency resource carrying the downlink data comprises the second frequency resource but does not include either the first frequency resource or the fourth frequency resource.

16. The apparatus according to claim 13, wherein no search space exists in the downlink control channel region, or at least one search space exists in the downlink control channel region.

* * * * *